United States Patent [19]

Hotchkin et al.

[11] Patent Number: 4,644,463
[45] Date of Patent: Feb. 17, 1987

[54] SYSTEM FOR REGULATING DATA TRANSFER OPERATIONS

[75] Inventors: Glenn T. Hotchkin, El Toro; David J. Mortensen, Mission Viejo; Jayesh V. Sheth, El Toro, all of Calif.

[73] Assignee: Burroughs Corporation, Detroit, Mich.

[21] Appl. No.: 764,520

[22] Filed: Aug. 12, 1985

Related U.S. Application Data

[63] Continuation-in-part of Ser. No. 447,389, Dec. 7, 1982, abandoned.

[51] Int. Cl.$^4$ .................................... G06F 9/00
[52] U.S. Cl. ..................................... 364/200
[58] Field of Search ... 364/200 MS File, 900 MS File

[56] References Cited

U.S. PATENT DOCUMENTS

| | | | |
|---|---|---|---|
| 4,162,520 | 7/1979 | Cook et al. | 364/200 |
| 4,258,418 | 3/1981 | Heath | 364/200 |
| 4,313,162 | 1/1982 | Baun et al. | 364/200 |
| 4,322,792 | 3/1982 | Baun | 364/200 |
| 4,390,964 | 6/1983 | Horky et al. | 364/900 |
| 4,542,457 | 9/1985 | Mortensen et al. | 364/900 |

FOREIGN PATENT DOCUMENTS 946981  5/1974  Canada.
1061913 9/1979  Canada.

Primary Examiner—Gareth D. Shaw
Assistant Examiner—Daniel K. Dorsey
Attorney, Agent, or Firm—Alfred W. Kozak; Nathan Cass; Kevin R. Peterson

[57] ABSTRACT

A peripheral-controller (called a Data Link Processor) optimizes the rate of data transfers between a host computer and magnetic tape peripherals by use of a block counter sensing system for monitoring the occupation-status of word-blocks in a buffer memory. The peripheral-controller provides Automatic Read/Write Logic for buffer-peripheral tape transfers and a burst mode routine for rapid host-buffer transfers of data words. The sensing system provides means to inform a microcode sequencer when certain action routines should be executed in order to maintain steady error-free data transfer operations which minimize the need for retries of data transfer cycles previously initiated.

15 Claims, 14 Drawing Figures

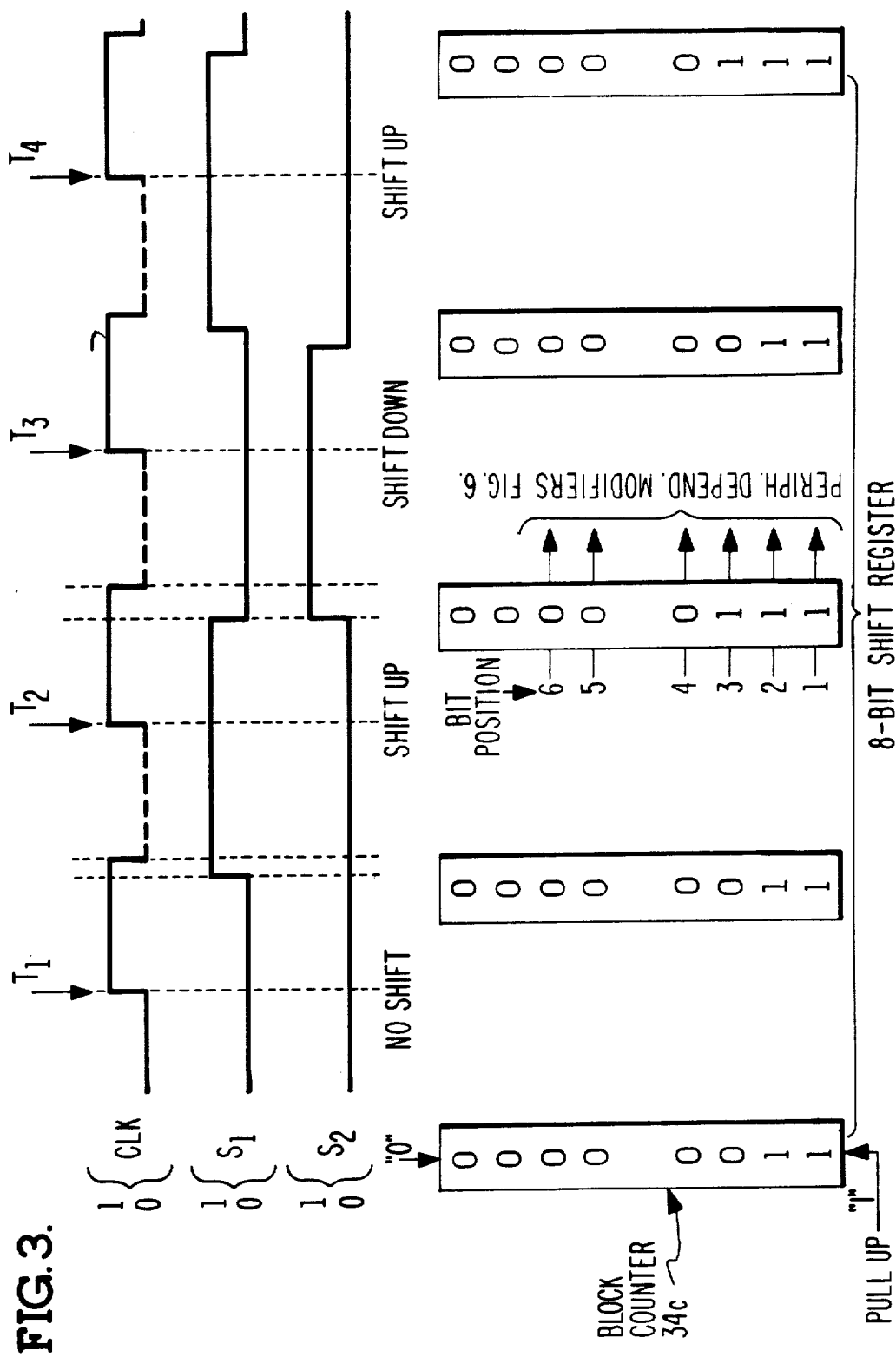

FIG.4.

| $S_{carry}$ | $P_{carry}$ | Read (R/W=0) | Write (R/W=1) |
|---|---|---|---|
| 0 | 0 | NO SHIFT | NO SHIFT |
| 0 | 1 | UP | DOWN |
| 1 | 0 | DOWN | UP |
| 1 | 1 | NO CHANGE | NO CHANGE |

$S_1=1$, $S_0=0$ $\begin{cases} \text{UP} \\ \text{ENABLE} \end{cases}$ = (READ * $\overline{S_{CARRY}}$ * $P_{CARRY}$) + (WRITE * $S_{CARRY}$ * $\overline{P_{CARRY}}$)

$S_1=0$, $S_0=1$ $\begin{cases} \text{DOWN} \\ \text{ENABLE} \end{cases}$ = (READ * $S_{CARRY}$ * $\overline{P_{CARRY}}$) + (WRITE * $\overline{S_{CARRY}}$ * $P_{CARRY}$)

$S_1=0$, $S_0=0$ $\begin{cases} \text{NO CHANGE} = \text{for (READ} * S_{CARRY} * P_{CARRY}) \\ + (\text{WRITE} * S_{CARRY} * P_{CARRY}) \end{cases}$ FF → HOST ACCESS ERROR = (READ * 6 Blkful) + (WRITE * $\overline{1\text{ BLKFUL}}$)

OR

BLOCK COUNTER ERROR ← FF

NOTES: + = OR
\* = AND

WHEN $S_1 = 0$
$S_0 = 1$

WHEN $S_1 = 1$
$S_0 = 0$

|  | READ | WRITE |
|---|---|---|
| SCRY ⟹ SCR8 | SHIFT DOWN | SHIFT UP |
| PCRY ⟹ PCR8 | SHIFT UP | SHIFT DOWN |
| SCRY ⟹ SCR8<br>PCRY ⟹ PCR8<br>IN THE SAME CLOCK CYCLE | $S_1 = S_0 = 1$<br>NO SHIFT | $S_1 = S_0 = 1$<br>NO SHIFT |
| INITIALLY | CLEARED | CLEARED |
| HOST ACCESS ERROR COND. WILL BE SET | WHEN 6BLKFUL BECOMES "1" | AFTER GETTING 6 BLOCKS FROM HOST WHEN 1 BLKFUL BECOMES "0" |

(PDB CARD 1)

| FIG.7A. | FIG.7B. |

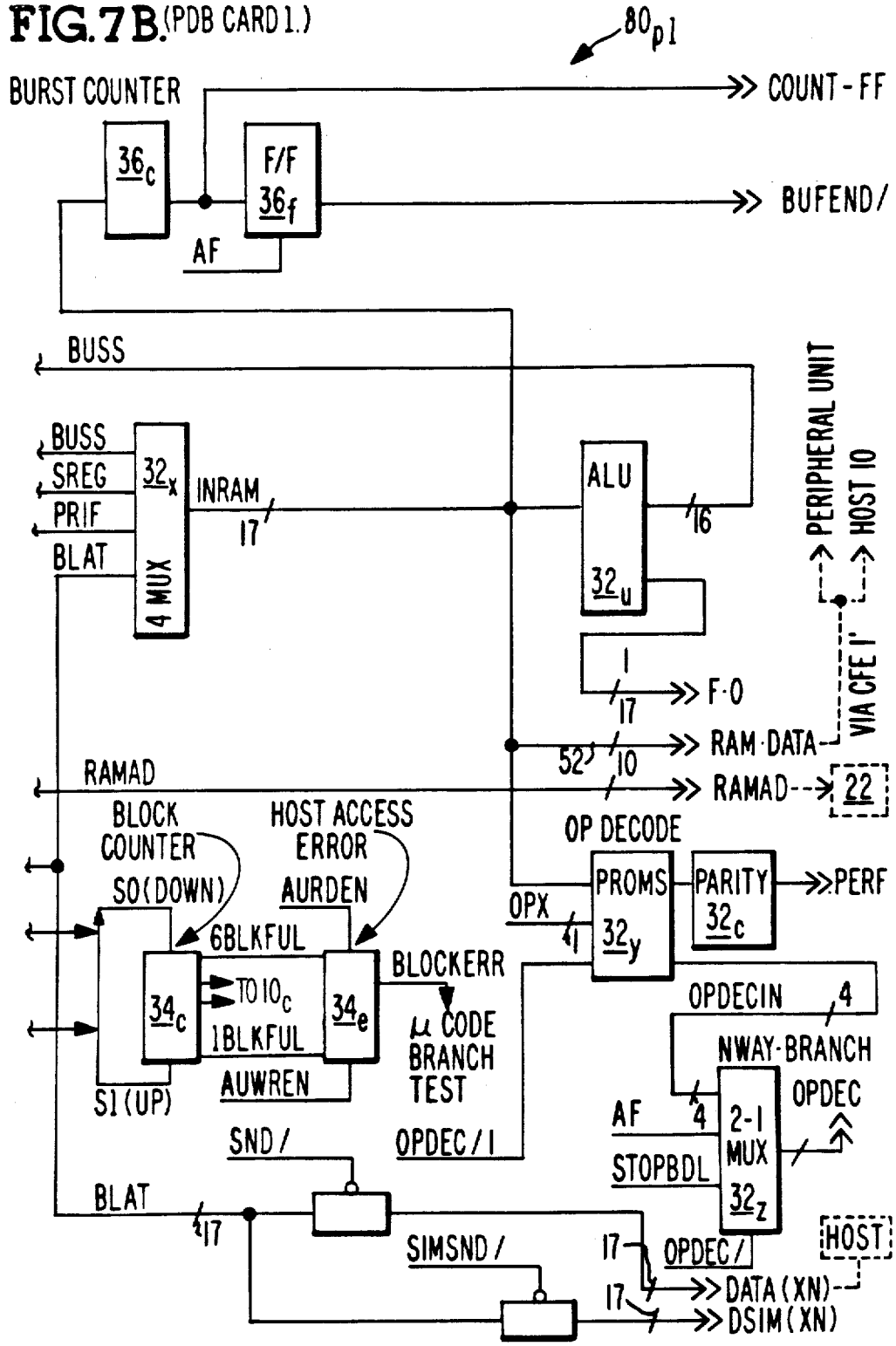
FIG. 7B. (PDB CARD 1.)

SYSTEM FOR REGULATING DATA TRANSFER OPERATIONS

This application is a continuation-in-part, of application Ser. No. 447,389, filed Dec. 7/82, now abandoned.

FIELD OF THE INVENTION

This invention is related to systems where data transfers are effectuated between a peripheral terminal unit and a main host computer wherein an intermediate I/O subsystem is used to perform the housekeeping duties of the data transfer.

CROSS REFERENCES TO RELATED INVENTIONS

This disclosure relates to the following patent applications:

"System for Regulating Data Transfer Operations", inventors G. Hotchkin, J. V. Sheth and D. J. Mortensen, filed Dec. 7, 1982 as U.S. Ser. No. 447,389.

"Burst Mode Data Block Transfer System", inventors J. V. Sheth and D. J. Mortensen, filed Jan. 11, 1983 as U.S. Ser. No. 457,178 now U.S. Pat. No. 4,542,457.

"Magnetic Tape-Data Link Processor", inventor J. V. Sheth, filed June 30, 1983, as U.S. Ser. No. 509,582.

"Automatic Write System for Peripheral Controller", inventor J. V. Sheth, filed June 30, 1983 as U.S. Ser. No. 509,796 now U.S. Pat. No. 4,534,013.

BACKGROUND OF THE INVENTION

A continuing area of developing technology involves the transfer of data between a main host computer system and one or more peripheral terminal units. To this end, there has been developed I/O subsystems which are used to relieve the monitoring and housekeeping problems of the main host computer and to assume the burden of controlling a peripheral terminal unit and to monitor control of data transfer operations which occur between the peripheral terminal unit and the main host computer system.

A particular embodiment of such an I/O subsystem has been developed which uses peripheral controllers known as data link processors whereby initiating commands from the main host computer are forwarded to a peripheral-controller which manages the data transfer operations with one or more peripheral units. In these systems the main host computer also provides a "data link word" which identifies each task that has been initiated for the peripheral-controller. After the completion of a task, the peripheral-controller will notify the main host system with a result/descriptor word as to the completion, incompletion or problem involved in the particular task.

These types of peripheral-controllers have been described in a number of patents issued to the assignee of the present disclosure and these patents are included herein by reference as follows:

U.S. Pat. No. 4,106,092 issued Aug. 8, 1978, entitled "Interface System Providing Interfaces to Central Processing Unit and Modular Processor-Controllers for an Input-Output Subsystem", inventor D. A. Millers, II.

U.S. Pat. No. 4,074,352 issued Feb. 14, 1978, entitled "Modular Block Unit for Input-Output Subsystem", inventors D. J. Cook and D. A. Millers, II.

U.S. Pat. No. 4,162,520 issued July 24, 1979, entitled "Intelligent Input-Output Interface Control Unit for Input-Output Subsystem", inventors D. J. Cook and D. A. Millers, II.

U.S. Pat. No. 4,189,769 issued Feb. 19, 1980, entitled "Input-Output Subsystem For Digital Data Processing System", inventors D. J. Cook and D. A. Millers, II.

U.S. Pat. No. 4,280,193 issued July 21, 1981, entitled "Data Link Processor for Magnetic Tape Data Transfer System", inventors K. W. Baun and J. G. Saunders.

U.S. Pat. No. 4,313,162 issued Jan. 26, 1982, entitled "I/O Subsystem Using Data Link Processors", inventors K. W. Baun and D. A. Millers, II.

U.S. Pat. No. 4,322,792 issued Mar. 30, 1982, entitled "Common Front-End Control for a Peripheral Controller Connected to a Computer", inventor K. W. Baun.

U.S. Pat. No. 4,534,013, issued Aug. 6, 1985, to inventor Jayesh V. Sheth and entitled "Automatic Write System For Peripheral-Controller".

U.S. Pat. No. 4,390,964, issued June 28, 1983, to inventors Joseph F. Horky and Ronald J. Dockal and entitled "Input-Output Subsystem Using Card Reader-Peripheral Controller". This patent discloses the use of a Distribution Card unit used to connect and disconnect the peripheral controller (Data Link Processor) to/from a host computer as required to accommodate data transfer operations.

The above patents, which are included herein by reference, provide a background understanding of the use of the type of peripheral-controllers known as "data link processors", DLP, used in a data transfer network between a main host computer and peripheral terminal unit.

In the above mentioned Baun patent, there was described a peripheral-controller which was built of modular components consisting of a common front end control circuit which was of a universal nature for all types of peripheral controllers and which was connected with a peripheral dependent board circuit. The peripheral dependent circuit was particularized to handle the idiosyncrasies of specific peripheral terminal units.

The present disclosure likewise uses a peripheral-controller (data link processor) which follows the general pattern of the above described system, in that the peripheral-controller uses a common control circuit or common front end which works in coordination with a peripheral dependent circuit which is particularly suited to handle a specific type of peripheral terminal unit, such as a Tape Control Unit (TCU) which connects to one or more magnetic tape units.

SUMMARY OF THE INVENTION

The present invention involves a data transfer network wherein a peripheral-controller known as a data link processor is used to manage and control data transfer operations between a peripheral such as a magnetic tape unit (or a tape control unit) and the main host computer system, whereby data is transferred rapidly in large blocks, such as a block of 256 words.

The data link processor provides a RAM buffer memory means for temporary storage of data being transferred between peripheral and host system. In this case, the RAM buffer is capable of holding at least six blocks or units of data, each of which consists of 256 words, each word being of 16 bits.

In order to facilitate and control those activities in which (a) data is sometimes being "shifted into" the RAM buffer memory means from either the peripheral unit or from the main host computer and (b) the data in the RAM buffer memory is being "shifted out" either to the magnetic tape unit peripherals, for example, or to the main host computer, it is necessary that the peripheral-controller and the system have data which informs it of the condition of the RAM buffer memory means with regard to the amount of data residing therein at any given period of time.

Thus, there is disclosed a system for regulating data transfer operations between host and peripheral whereby a peripheral-controller senses blocks of data stored in its RAM buffer in order to choose routines for data transfer appropriate to the data condition of the RAM buffer. The peripheral-controller makes use of a block counter monitoring system which will inform the peripheral-controller and the main host system of the "numerical block status" of data in the RAM buffer memory means.

In particular, the present invention discloses a system whereby the common front end (common control) circuit uses routines providing microcode instructions to address registers which access locations in the RAM buffer memory for the insertion of data or the withdrawal of data. There are two address registers, one for addresses of data taken from/to the peripheral unit (peripheral address register) and one for addresses of data (system address register) which are to be forwarded from/to the main host computer. The peripheral address register is enhanced by use of an auxiliary Automatic Incrementing Peripheral Register unit to help establish buffer memory addresses during buffer-peripheral word transfers using the system's Automatic Read/Write logic mode.

A block counter logic circuit receives input from the peripheral address register and the system address register. In addition, a flip-flop output to the block counter logic circuit indicates the direction of data flow as being a "Write" (host-to-peripheral) or a "Read" (peripheral-to-Host). The block counter logic circuit provides two output logic signals which control a block counter. This enables the block counter to be shifted up or shifted down so that the internal signal data indicates the number of blocks of data residing in the RAM buffer memory. Certain parameters may be set to trigger signal output conditions when the amount of data in the RAM buffer memory falls below a certain figure.

BRIEF DESCRIPTION OF THE DRAWINGS

FIG. 3 is a drawing showing an eight bit shift register which can be shifted up or down according to conditions which occur between certain logic signals and clock signals.

FIG. 4 is a diagram showing how the block counter logic unit of FIG. 1 is organized to operate during Read or Write operations and the effect of either shifting up or shifting down the shift register.

FIGS. 7A and 7B combine to show the first card of the peripheral dependent unit circuitry.

A "Read" operation takes data from a peripheral magnetic tape unit and temporarily stores it in a RAM memory buffer for later transfer to the host system.

A "Write" operation takes data from the main host system for temporary storage in the RAM buffer memory for subsequent transfer to a selected magnetic tape unit via a TCU or Tape Control Unit.

GENERAL SYSTEM OPERATION

Figure 2:
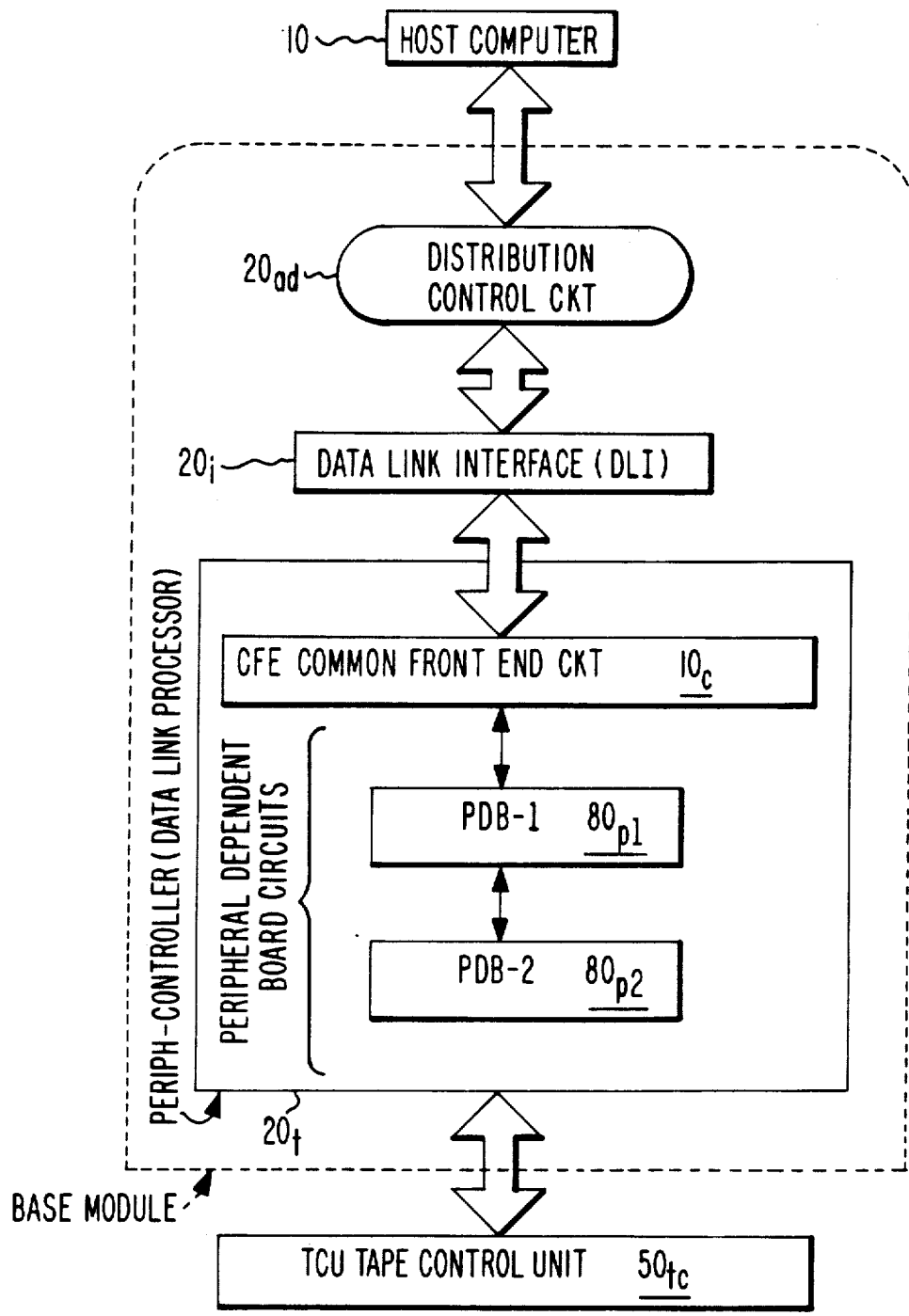
FIG. 2 is a system diagram showing the host computer cooperating with a peripheral-controller in order to control data transfer to and from a peripheral unit.

To initiate an operation, the host system 10, FIG. 2, sends the peripheral-controller (data link processor $20_t$) an I/O descriptor and also descriptor link words. The term "DLP" will be used to represent the Data Link Processor (peripheral-controller $20_t$). The "I/O descriptor" specifies the operation to be performed. The descriptor link contains path selection information and identifies the task to be performed, so that when a report is later sent back to the main host system 10, the main host system will be able to recognize what task was involved. After receipt of the I/O descriptor link, the data link processor (DLP) makes a transition to one of the following message level interface "states".

(a) Result Descriptor: This state transition indicates that the data link processor $20_t$ is returning a result descriptor immediately without disconnection from the host computer 10. For example, this transition is used when the DLP detects an error in the I/O descriptor.

(b) DISCONNECT: This state transition indicates that the peripheral-controller $20_t$ which is designated as the Magnetic Tape-Data Link Processor (MT-DLP) cannot accept any more operations at this time and that the I/O descriptor and the descriptor link were received without errors. This state also indicates that data transfers or result descriptor transfers can occur.

(c) IDLE: This state transition indicates that the DLP $20_t$ can accept another legal I/O operation immediately and that the I/O descriptor and the descriptor link were received without errors.

When the operation is completed, the DLP $20_t$ returns a result descriptor indicating the status of the operation to the main host system. If the DLP detects a parity error on the I/O descriptor or the descriptor link, or if the DLP cannot recognize the I/O descriptor it received, then the DLP cannot proceed with execution of the operation. In this case, the DLP returns a one-word result descriptor to the host. In all other cases the DLP returns a two-word result descriptor.

The data link processor $20_t$ is a multiple-descriptor data link processor capable of queuing one I/O descriptor for each magnetic tape unit to which it is connected. There are certain descriptors (Test/Cancel; Test/Discontinue; and Test/ID) which are not queued, but which can be accepted at any time by the DLP. Test/Cancel and Test/Discontinue OPs are issued against a single magnetic tape unit in a queue dedicated to that peripheral unit, and require that an I/O descriptor for that particular magnetic tape unit already be present within the DLP. If an I/O descriptor is received and violates this rule, the DLP immediately returns a result descriptor to the host. This result descriptor indicates "descriptor error" and "incorrect state".

As previously discussed in the referenced patents, the MT-DLP utilizes the following status states (STC) transitions when "disconnected" from the host:

STC=3 to STC=1; IDLE to DISCONNECT indicates that the DLP is attempting to process a queued OP.

STC=1 to STC=3; DISCONNECT to IDLE indicates that the DLP is prepared to accept a new I/O descriptor.

STC=3 to STC=5; IDLE to SEND DESCRIPTOR LINK indicates that the DLP is executing an OP, and that the DLP requires access to the host computer.

STC=1 to STC=5; DISCONNECT to SEND DESCRIPTOR

LINK indicates that the DLP is executing an OP, and that the DLP requires access to the host computer.

The DLP status states can be represented in a shorthand notation such as STC=n.

Upon completion of an I/O operation, the data link processor forms and sends the result descriptor to the host system. This descriptor contains information sent by the tape control unit $50_{tc}$ to the DLP in the result status word, and also information generated within the DLP. The result descriptor describes the results of the attempt to execute the operation desired.

DESCRIPTOR MANAGEMENT

All communications between the DLP $20_t$ and the host system 10 are controlled by standard DLP status states as described in the previously referenced patents. These status states enable information to be transferred in an orderly manner. When a host computer 10 connects to the DLP $20_t$, the DLP can be in one of two distinct states: (a) ready to receive a new descriptor, or (b) busy.

When in STC=3 (IDLE), the DLP can accept a new I/O descriptor. When in STC=1 (DISCONNECT) or in STC=5 (SEND DESCRIPTOR LINK), then the DLP is busy performing a previously transferred operation.

When the DLP receives an I/O descriptor and descriptor link that does not require immediate attention, the DLP stores the descriptor in its descriptor queue. The DLP is then able to receive another I/O descriptor from the host system.

When the host system 10 "Disconnects" from the DLP $20_t$ after issuing one or more queued I/O descriptors, then the DLP initiates a search of its descriptor queue. This search continues until the DLP finds an I/O descriptor that needs DLP attention, or until the host "reconnects" to send additional I/O descriptors. If the DLP finds an I/O descriptor that requires attention, and if the descriptor specifies neither a Test/Wait for Unit Available OP, nor a Test/Wait for Unit Not Available OP, then the DLP verifies that the host is still "disconnected". If these conditions are met, the DLP goes to STC=1 (DISCONNECT) and initiates execution of the descriptor. Once the DLP goes to STC=1, then no further I/O descriptors are accepted from the host until the initiated operation has been completed and a result descriptor has been returned to the host.

The DLP searches its descriptor queue on a rotational basis. The order for search is not disturbed by the receipt of one or more new I/O descriptors, nor by the execution of operations. This means that all queued entries are taken in turn regardless of DLP activity and all units have equal priority.

When cleared, the DLP halts all operations in progress with the peripherals and invalidates all the queued I/O descriptors, and returns to Status STC=3 (IDLE).

DLP-DATA BUFFERS AND DATA TRANSMISSION

The data buffer 22 (FIGS. 1, 5A, 8) of the DLP provides storage for six blocks of data which are used in a "cyclic" manner. Each of the six blocks holds a maximum of 512 bytes (256 words) of data. Data is transferred to or transferred from the host system one block at a time, via the buffer 22, followed by a longitudinal parity word (LPW). Data is always transferred in full blocks (512 bytes) except for the final block of data for a particular operation. This last block can be less than the 512 bytes, as may be required by the particular operation.

Figure 1:
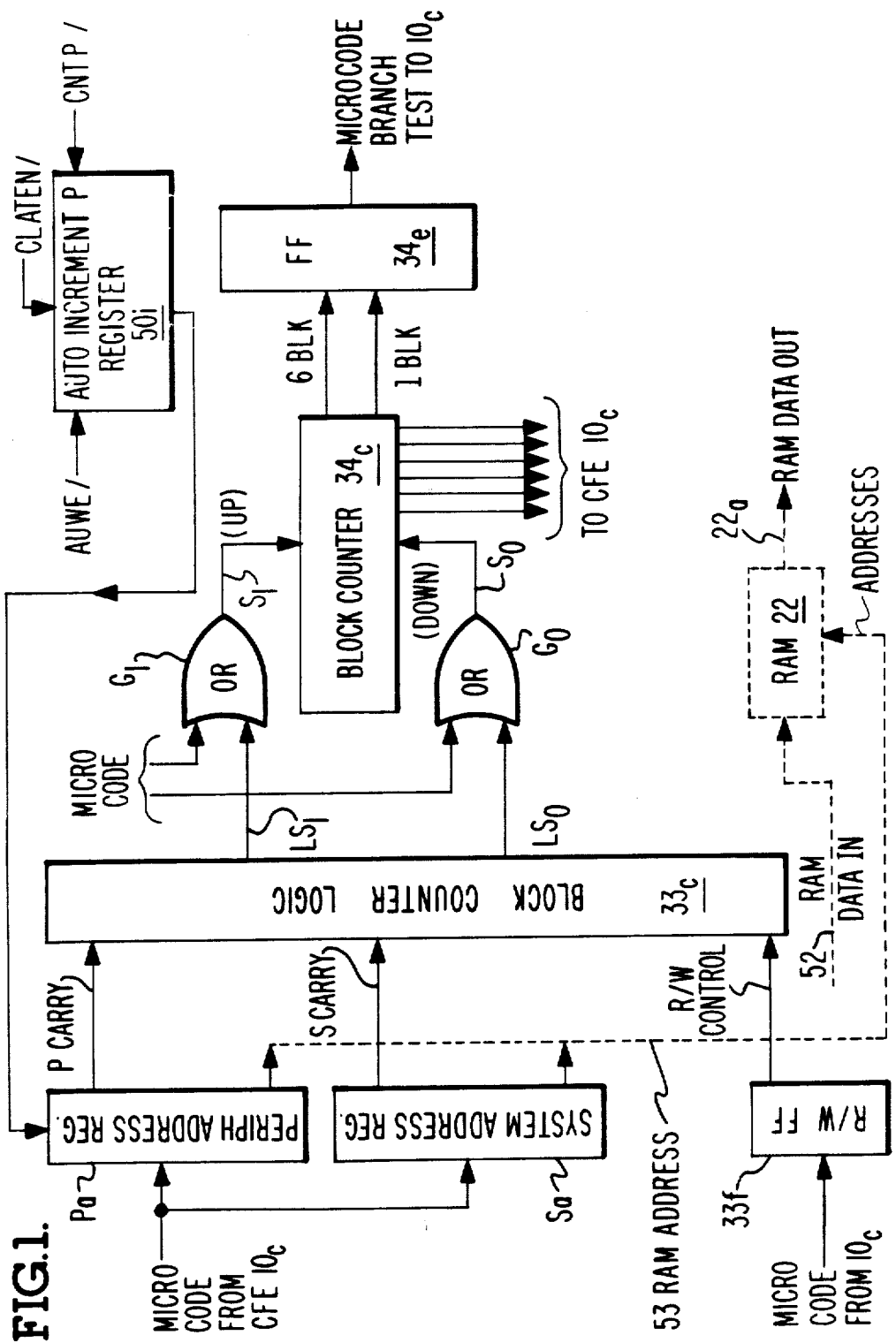
FIG. 1 illustrates the block counter system of the present disclosure which is used to inform the data transfer system of the status of a buffer memory means.

As seen in FIG. 1, logic circuitry (to be described hereinafter) is used to feed information to a block counter $34_c$ which will continuously register the number of blocks of data residing in buffer 22 at any given moment. When certain conditions occur, such as a full buffer, or empty buffer, or "n" number of blocks, the counter $34_c$ can set to signal unit $10_c$ via the peripheral modifier lines of FIG. 6 or to trigger a flip-flop $34_e$ which will signal the common control circuit unit $10_c$ (FIG. 2) to start routines necessary to either transfer data to the host 10 (after reconnecting to the host) or to get data from the host 10 to transfer to the buffer 22 (seen in FIG. 1, and FIG. 2); or else the front end unit $10_c$ (FIG. 2) can arrange to connect the DLP $20_t$ to the peripheral (as tape control unit $50_{tc}$) for receipt of data or for transmission of data.

During a Write operation, the block counter $34_c$ (FIGS. 1, 7B) counts the number of blocks of data received from the host system 10. The data link processor "disconnects" from the host system once the DLP has received six blocks of data; or it will disconnect upon receipt of the "Terminate" command from the host system (a Terminate indicates the "end" of the Write data for that entire I/O operation). After disconnecting from the host, the data link processor connects to the peripheral tape control unit (TCU $50_{tc}$). Once proper connection is established between the data link processor and the tape subsystem, the data link processor activates automatic logic which allows the tape control unit $50_{tc}$ a direct access to the DLP RAM buffer 22 for use in data transfers.

After the data link processor has transmitted one block of data to the tape control unit, the data link processor attempts to "reconnect" to the host system by means of a "poll request" (as long as the host 10 has not "terminated" the operation). Once this reconnection is established, the host transfers additional data to buffer 22 of the data link processor $20_t$ (FIG. 2). This transfer continues until either the six blocks of RAM buffer memory 22 are again full (a block which is in the process of being transferred to the tape control unit is considered full during this procedure), or until the host 10 sends a "Terminate" command. Data transfer operations between the data link processor $20_t$ and the tape control unit $50_{tc}$ continue concurrently (on interleaving cycles) with the host data transfers occurring between host 10 and DLP $20_t$ (via the buffer 22).

If the data link processor $20_t$ has not successfully reconnected to the host 10 before the DLP has transmitted, for example, four blocks of data to the tape control unit $50_{tc}$, the data link processor sets "emergency request" on the data link interface $20_i$, FIG. 1. If the "emergency request" is not successfully serviced before the DLP has only one block of data remaining for transmission to the tape control unit, the data link processor sets a "Block Error" condition by signal from flip-flop $34_e$ to circuit $10_c$. This is reported to the host system as a "host access error" in the result descriptor and will be retried subsequently.

The last block of data for any given I/O operation is transferred to the tape control unit $50_{tc}$ directly under micro-code control. During a "Read" operation, the data link processor first attempts to connect to the tape control unit $50_{tc}$. Once a successful connection is accomplished, the data link processor initiates automatic logic to begin accepting data from the tape subsystem. Once the data link processor has received two blocks of data (or once the DLP receives all the data from the operation if the total length is less than two blocks), the data link processor attempts to connect to the host using a "poll request". The data link processor continues to accept tape data while at the same time affecting this host connection.

If the host does not respond to the "poll request" before four blocks of data are present in the DLP RAM buffer 22, the data link processor sets "emergency request" on the data link interface $20_i$. If no connection to the host system is effectuated before all of the six RAM buffers are filled, then the data link processor sets "host access error" in the result descriptor.

Once the host system answers a "poll request", the data link processor $20_t$ starts to send data to the host system 10 (which data came from a peripheral magnetic tape unit) while at the same time continuing to receive data from the tape control unit $50_{tc}$. After the host 10, FIG. 2, has received one block of data, the data link processor checks whether or not two full blocks of data remain to be transferred to the host. If this is so, the DLP uses a "break enable". If a "break enable" request is granted, then transmission of the next data buffer to the host continues to occur. If there are less than two full blocks of data in the RAM buffer 22 (or if the "break enable" is refused), the data link processor disconnects from the host and waits for two full blocks of data to be present. If a "break enable" is refused, the data link processor initiates another "poll request" immediately after disconnection.

When the data link processor has completed data transfer, the tape control unit $50_{tc}$ enters the result phase and sends two words of result status to the data link processor $20_t$. The DLP then incorporates this information, plus any internal result flags, into the result descriptor which the DLP then sends to the host.

DESCRIPTION OF PREFERRED EMBODIMENT

Referring to FIG. 2, the overall system diagram is shown whereby a host computer 10 is connected through an I/O subsystem to a peripheral unit, here, for illustrative purposes, shown as a tape control unit $50_{tc}$.

This tape control unit (TCU) is used to manage connection to a plurality of Magnetic Tape Unit (MTU) peripherals. As per previous descriptions in the above cited patents which were included by reference, the I/O subsystem may consist of a base module which supports one or more various types of peripheral-controllers, in addition to other connection and distribution circuitry such as the distribution control circuit $20_{od}$ and the data link interface $20_i$. The peripheral-controller $20_t$ is shown in modular form as being composed of a common front end circuit $10_c$ and a peripheral dependent circuit shown, in this case, as being composed of two peripheral dependent boards designated $80_{p1}$ and $80_{p2}$.

In this network situation, it is often desired that data from the main host computer be transferred on to a peripheral unit, such as a magnetic tape unit, for recording on tape. This would be done via a peripheral tape control unit TCU such as $50_{tc}$. Likewise, at times it is desired that data from the magnetic tape unit be passed through the tape control unit to be read out by the host computer. Thus, data is transferred in a bidirectional sense, that is, in two directions at various times in the activities of the network.

The key monitoring and control unit is the data link processor $20_t$ which when initiated by specific commands of the host computer will arrange for the transfer of the desired data in the desired direction.

The RAM buffer 22 (of FIGS. 1, 5A) is used for temporary storage of data being transferred between peripherals and the main host computer. In the preferred embodiment, this RAM buffer has the capability of storing at least six "blocks" of data, each block of which consists of 256 words.

The Magnetic Tape Data Link Processor (MT-DLP) consists of three standard 96-chip multi-layered printed circuit cards that plug into adjacent slots in the backplane of the base module (FIG. 2). The base module for this system has been previously described in U.S. Pat. No. 4,322,792 and the previously referenced patents.

The common front end card $10_c$ (FIGS. 2, 6) contains:
(a) The master control logic;
(b) 1K×17-bit RAM words;
(c) 1K×49-bit microcode PROM words which sequence and control the operation of the DLP;
(d) The interface receivers from the distribution card $20_{od}$ and from a maintenance card in the base module.

In addition to the common front end card $10_c$, there are two PDBs or peripheral dependent boards. These are designated PDB/1 and PDB/2 and are shown on FIGS. 7A, 7B, 8. These PDBs provide control signals and the interface to the magnetic tape subsystem.

The PDB/1 card contains: (FIGS. 7A, 7B)
(a) The System and Peripheral RAM Address Registers including an automatic peripheral incrementing register;
(b) The Binary-BCD Address Decode PROMs;
(c) Op Decode PROMs;
(d) N-Way Microcode Branch Logic;
(e) Burst Counter;
(f) Block Counter;
(g) Host Access Error Logic;
(h) Arithmetic Logic Unit (ALU).
(i) Auto Logic Control/Selection The second peripheral dependent board card, FIG. 8, designated PDB/2 contains the following:
(a) The Auto Read Logic;
(b) Auto-Write Logic;

(c) Input (Read) and Output (Write) Latches;
(d) A 1K×17-bit RAM buffer extension of the Common Front End RAM 22;
(e) Clock Logic for the Tape Control Unit $50_{tc}$;
(f) Interface Logic for the Tape Control Unit $50_{tc}$.

As discussed in the previously referenced patents, each card in the peripheral-controller (Data Link Processor) has "foreplane" connectors through which frontplane cables can interconnect these cards. The cards are slide-in cards which connect at the backplane connectors into the base module. The top two foreplane connectors of all three cards of the DLP are interconnected by means of three-connector, 50-pin foreplane jumper cables. The common front end is connected to the first board, PDB/1, via connector and cable and the board PDB/1 is connected to the second board, PDB/2, via another connector and cable. This is done by means of two-connector, 50-pin foreplane jumper cables. From the connector on the second board PDB/2, there is a 50-conductor cable which is connected to an interface card which plugs into an interface panel board. Connections to the tape subsystem TCU $50_{tc}$ is made from this interface panel board.

COMMON FRONT END CARD (CFE 10c)

Figure 6:
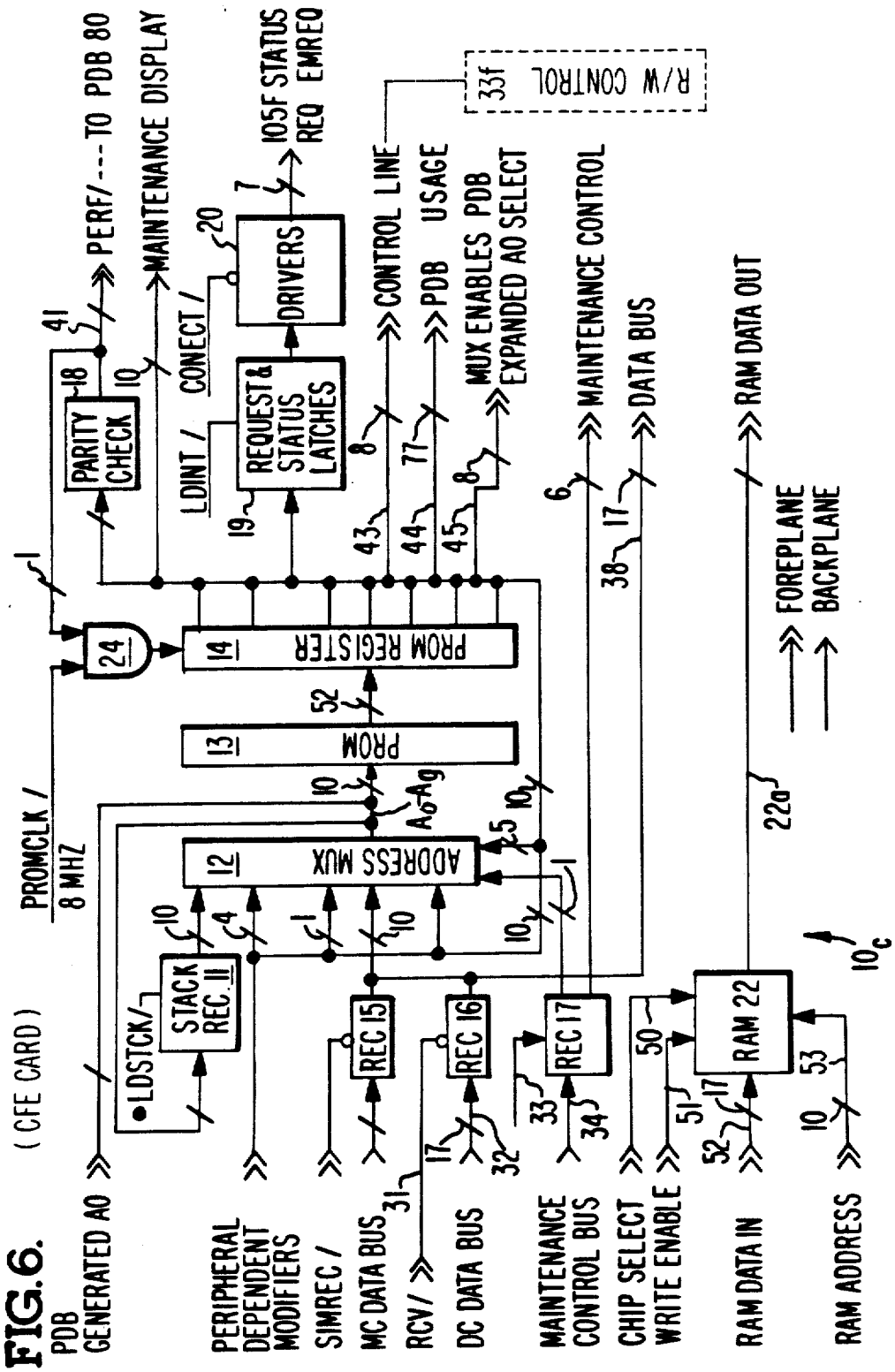
FIG. 6 is a drawing of the common front end unit which provides a state machine sequencer for microcode instructions.

In FIG. 6 there is seen a basic block diagram of the common front end card which has previously been described in U.S. Pat. No. 4,322,792 entitled "Common Front End Control for a Peripheral Controller Connected to a Computer", inventor Kenneth W. Baun. The most significant item of the common front end card designated as $10_c$ in FIG. 2 is the PROM 13 which is a 1K×52-bit word memory. Only 49 (including odd parity bits) of the 52 bits are used. The last three bits are not used or checked for parity.

PROM 13 consists of 13 PROM chips of 1K×4-bit chips which are connected in parallel to form the 1K×52-bit PROM. The contents of these PROMs 13 are called the microcode which controls all of the DLP functions. The microcode address lines, designated A0-A9, are wired in parallel to all 13 chips. The eight megahertz clock (PROMCLK/) latches the next 52-bit microcode word output from the PROM 13 into the PROM microcode register 14.

The common front end card $10_c$ contains logic which generates the address for the microcode PROMs. Also, certain component terms in this logic are further generated on the peripheral dependent boards. The CFE $10_c$ has a stack register 11 composed of three binary counter chips. This register contains the value of the current PROM address or the subroutine return address for a stacked branch operation.

Seventeen 1K×1-bit RAM chips are connected in parallel to make up the random access buffer memory 22 on the common front end card $10_c$. This RAM 22 is made of 1K×17-bits. The Write Enable, the Chip Select, and the 10 RAM address lines are generated on the first PDB card $80_{p1}$, FIGS. 7A, 7B, and these address lines are routed in parallel to all of the RAM chips on the CFE $10_c$.

Figure 8:
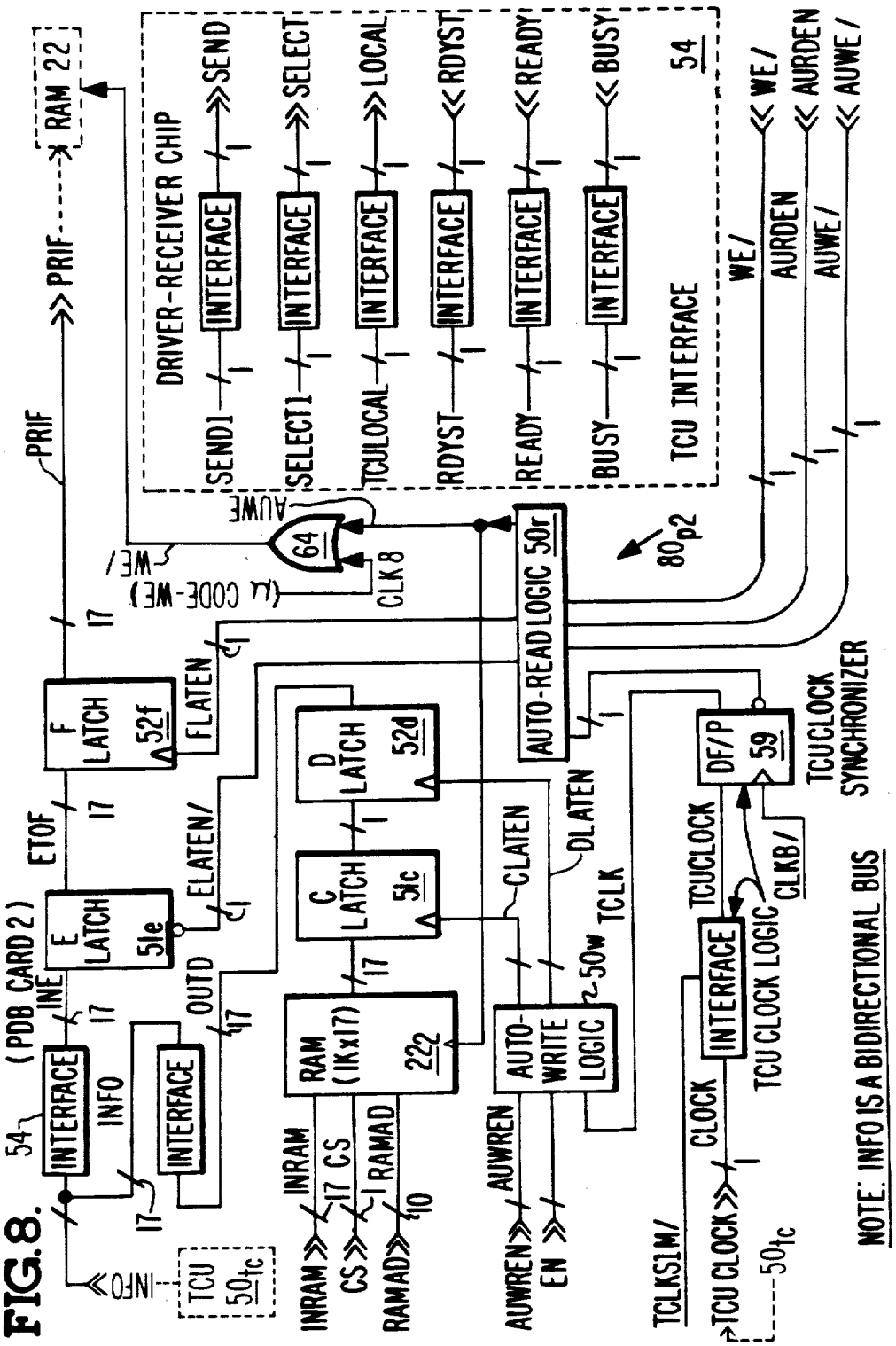
FIG. 8 shows the second card of the peripheral dependent unit circuitry.

An additional 1K×17-bit RAM buffer memory $22_2$ is provided on the PDB/2 card $80_{p2}$, FIG. 8. Thus, the RAM buffer memory is 2K words deep. The same Write Enable, Chip Select and RAM address lines that feed the RAM 22 also feed the "extended" RAM $22_2$ on the second board PDB/2. A "low" signal chip select is used to select the RAM 22.

The "high" chip select signal selects the extended buffer RAM $22_2$ on PDB/2. All the data inputs and data outputs to the RAM buffer memories are sourced, sunk and controlled by the peripheral dependent boards PDB/1 and PDB/2.

The common front end $10_c$ also contains much of the logic for the hostward DLP interfaces. The "interface" to the distribution card $20_{od}$ and a path selection module is called the Data Link Interface (DLI) shown as $20_i$ on FIG. 2. The common front end $10_c$ contains the drivers and receivers for the control line on the DLI. The common front end card also contains the receivers for the bi-directional DLI data bus (DATAxx/0). The drivers and the directional controls for this particular bus are located on the first PDB card, PDB/1.

The common front end card contains the receivers and control logic which enables connection to a maintenance card in the base module, and which governs test diagnostics for the data link processor. The CFE $10_c$ also contains the receivers for the 17-bit bi-directional data simulation bus (DSIMxx/0). This bus provides both data simulation and microcode PROM address override when used in the "maintenance mode". The drivers for this bus are located on the PDB/1 card. The CFE $10_c$ also contains some of the maintenance display logic used in DLP diagnostic routines.

The maintenance interface line (SWH0.1/0.0) is used to override the microcode PROM address. When the DLP is connected to the maintenance card, and when this line is "low", the DSIMxx/0 lines provide the microcode addresses. This permits the verification of the contents of the microcode, and also allows special microcode words to be used to govern DLP action during diagnostics.

PERIPHERAL DEPENDENT CIRCUITRY

Figures 7, 7A:
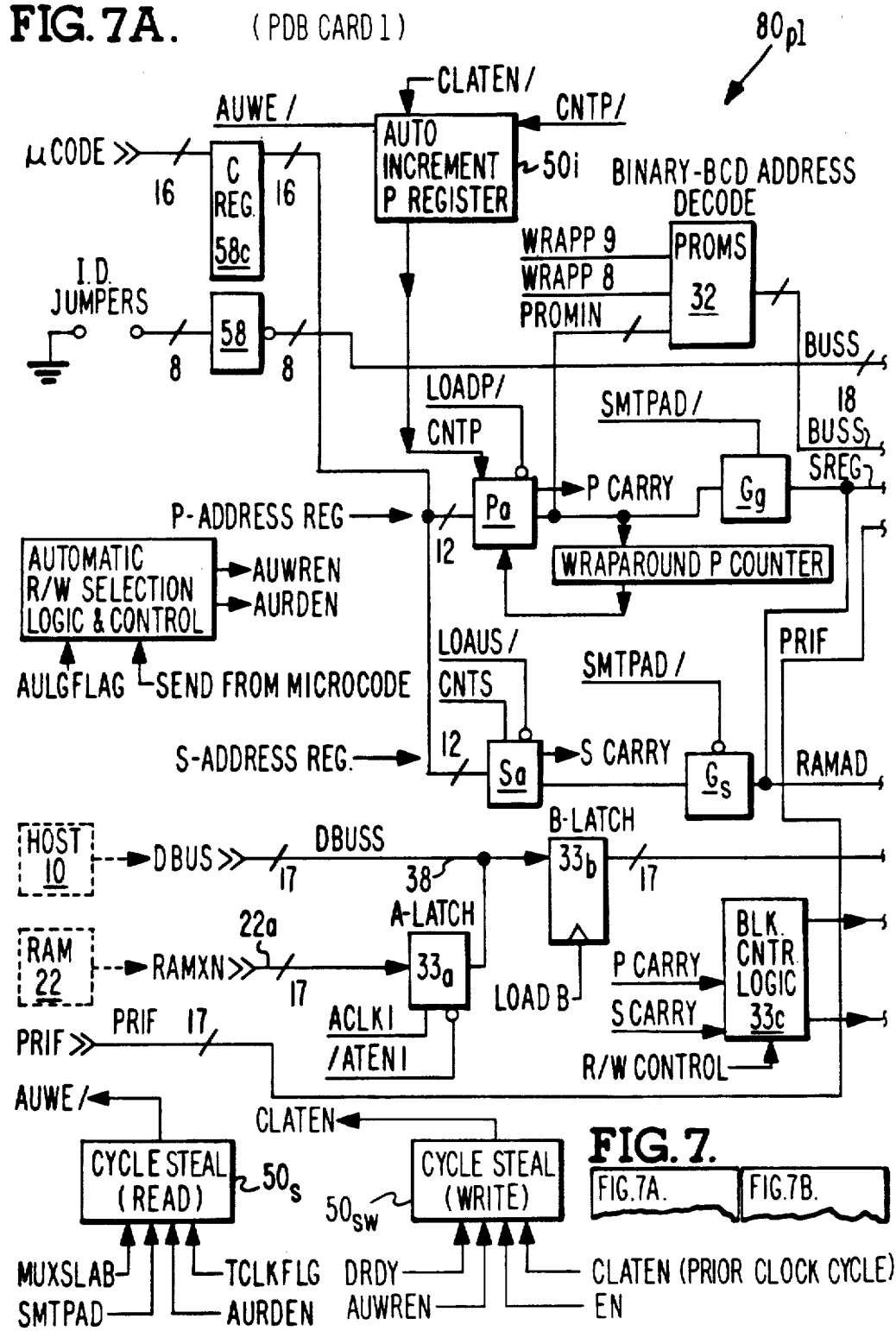

The primary function of the peripheral dependent boards PDB/1, PDB/2 is to provide the interface to the peripheral tape subsystem which is controlled by tape control unit $50_{tc}$, FIG. 2. FIGS. 7A, 7B are functional block diagrams of the first PDB card designated PDB/1. FIGS. 7A, 7B show the first PDB card containing addressing lines, data path lines and data path control for the DLP RAM 22 (FIG. 6) and $22_2$ (FIG. 8), the arithmetic logic unit $32_u$ (ALU) for the DLP, in addition to longitudinal and vertical parity generation and checking logic, microcode branching and control decode logic, peripheral data block counting and a binary-BCD converter.

Two twelve-bit address registers $P_a$ and $S_a$ (FIG. 7A) are used to store RAM addresses. The system address register ($S_a$) is used when the MT-DLP is communicating with the host 10, and the peripheral address register ($P_a$) is used when the data link processor is communicating with the tape control unit, TCU $50_{tc}$. Ten-bits are needed to address the RAM (22 or $22_2$). Bit number 9 is the RAM chip select. When this bit is low, the RAM on the common front end card $10_c$ is addressed (RAM 22). When the chip select line is "high", the RAM $22_2$ on the second PDB card PDB/2 is addressed. Bit 10 of the address register provides function control. Both of these registers are addressed by the common front end microcode through the constant register, designated C-register, $58_c$, FIG. 7A.

The arithmetic logic unit $32_u$ (ALU), FIG. 7B, is comprised of four 4-bit bi-polar-bit-slice microprocessors cascaded to form one 16-bit processor. The ALU contains sixteen 16-bit internal registers which can be loaded by the CFE microcode (from $10_c$) for both arithmetic and Boolean operations. Nine bits of microcode are used to control the ALU 32.

The ALU 32 (FIG. 7B) receives input data from a 4×1 multiplexor $32_x$ (MUX). The same multiplexor $32_x$ also forms the data input 52 to the DLP RAM buffer 22 on the line labelled RAM-DATA of FIG. 6.

The data path on the PDB/1 card of FIG. 7A consists of two latches, $33_a$ and $33_b$. The A-latch $33_a$ of FIG. 7A receives the RAM buffer 22 output data. The B-latch $33_b$ receives data from the A-latch, from the common front end DLI receivers or else from the common front end DSIM bus receivers. B-latch receives these inputs on line 38 of FIG. 7A. The B-latch outputs are fed to the 4×1 multiplexor $32_x$ and then to the ALU $32_u$ or else to the RAM buffer 22, or to the DLI data bus (DATAxx/0), or to the MI data simulation bus (DSIMxx/0). The drivers for these last two interfaces are located on the first PDB card designated PDB/1.

The block counter $34_c$ of FIG. 7B keeps track of the number of data blocks available for transfer or for acceptance with the host system and with the tape subsystem, $50_{tc}$.

BURST MODE

The MT-DLP has capabilities of utilizing a burst mode data transfer mode wherein data can be transferred to the host system 10 at the maximum DLI rate of 64 megabits per second (depending upon the speed capability of the host system). When in the burst mode, the 8-bit burst counter $36_c$ (FIG. 7B) maintains a count of the number of words remaining to be transferred between the host and the data link processor during the burst transfer cycle.

A converter $32_p$ (FIG. 7A) designated Binary-to-BCD Address Decode which uses binary address decode logic, converts binary data from the host system into binary-coded-decimal (BCD) data for use of the peripheral tape subsystem.

FIG. 8 shows a block diagram of the second peripheral dependent board designated PDB/2. This card contains an extension RAM $22_2$ of the RAM memory 22 (which is located on the CFE card $10_c$). The RAM memory extension on the second PDB card is designated as $22_2$ and contains a 1K×17-bit memory area. Particularly useful for buffer-peripheral transfers is the logic designated as the Auto Read Logic $50_r$ and the Auto Write Logic $50_w$. In addition, the second peripheral dependent board card includes input latches $51_e$ and $51_c$ and output latches $52_f$ and $52_d$. A clock-strobe (proportional to tape speed) signal from peripheral $50_{tc}$ (TCU clock) feeds to a peripheral synchronizing clock circuit 59 for the peripheral subsystem (PRIF), and to the interface 54 (driver-receiver) which connects to the tape control unit TCU $50_{tc}$. This interface 54 contains drivers and receivers for the various control signal lines between the PDB/2 card and the tape control unit, $50_{tc}$.

The extended RAM memory $22_2$ on PDB/2 (FIG. 8) is a 1K×17-bit memory which uses the same address lines and the same "write enable" as the common front end RAM buffer memory 22. A "high" chip select signal selects the extended RAM $22_2$, as previously discussed.

Unique to the magnetic tape data link processor is the logic known as the Auto-Write and Auto-Read Logic ($50_w$, $50_r$). After being initialized and enabled, this logic is capable of transferring data to or from the tape control unit independently from any further microcode control or intervention from the CFE $10_c$. Thus, the MT-Data Link Processor can "concurrently" transfer data on both the Data Link Interface $20_i$ with the host 10 and at the same time, transfer data on the peripheral interface with the tape control unit. This is accomplished by interleaving clock cycles via cycle steal unit $50_s$.

Cycle Steal Operations

While the basic clock cycles (CLK8) are normally devoted to "burst-mode" transfers between host 10 and buffer memory 22, the system is organized for "concurrent" data transfers between buffer 22 and the tape peripheral unit $50_{tc}$ through use of a "cycle stealing" operation. Thus, automatic transfers of data words between buffer and tape peripheral are accomplished by "stolen" clock cycles which interleave the normal basic clocks used for host-buffer transfers.

The following discussion will illustrate how this is effectuated for both Automatic Read (tape-to-buffer) data transfers and for Automatic Write (buffer-to-tape) data transfers. It should be noted that these Automatic Read/Write operations only concern buffer-tape transfers in either direction, and do not apply to host-buffer transfers.

Automatic Read

Referring to FIG. 8, there is seen a data channel (INFO) from tape unit $50_{tc}$ through receiver interface 54 to E latch $51_e$, then to F latch $52_f$ which connects to buffer memory 22 (RAM). The buffer memory can be activated by a strobe signal "WE/" from gate 64 which provides the stolen clock cycle for transfer of a data word from F latch $52_f$ to the buffer 22.

The TCU clock logic 59 of FIG. 8 is used to provide two flag bits of data designated as TCUFLG 2 and TCUFLG 1. When both latches E and F are empty, these flag bits are 0 and 0. If latch F is full and latch E is empty, then these flags indicate 0 and 1. If both latches E and F are full, then these flags indicate 1 and 0. Initially, latches E and F (FIG. 8) are empty until an Auto Read cycle steal occurs whereupon the following actions occur.

(a) A data word is moved from the tape peripheral (via receiver 54) into either the E latch or the F latch depending on the status of TCUFLG 2 and TCUFLG 1. Then the cycle steal moves the data word (in F latch) over into the RAM buffer 22 at an address pointed to by the $P_a$ register (FIG. 7A).

(b) Once the data word is written into buffer memory 22, the $P_a$ register gets incremented automatically (by $50_i$ of FIG. 7A) in order to point to the next address in buffer 22, i.e., the $P_a$ register is now ready for the next cycle steal (when it occurs).

(c) The data word in the E latch will move into the F latch (FIG. 8).

(d) The TCU flag signals (TCUFLG 1 and TCUFLG 2) will be updated to indicate the appropriate status condition of the E and F latches at that clock cycle.

The Automatic Read cycle steal operation occurs as seen in $50_s$ of FIG. 7A upon the occurrence of certain conditions:

(RC-1): The automatic transfer logic $50_a$ must be "ON" as indicated by the signal AURDEN (auto-read-enable).

(RC-2): The $P_a$ register is selected (thus the system register $S_a$ (FIG. 7A) has not been selected) so that the $P_a$ is active. This is signaled by the signal SMTPAD in its high or true state.

(RC-3): The flags TCUFLG 2 and 1 indicate that either latches E and F are full (TCUFLG 2=1 and TCUFLG 1=0) or that only F is full and E is empty (where TCUFLG 2=0 and TCUFLG 1=1). These flags 1 and 2 when fed to an exclusive OR gate will provide the signal TCLKFLG shown in FIG. 8 as input to $50_s$ which represents the automatic read cycle-steal condition.

(RC-4): The signal MUX-PRIF is selected (in $32_x$ of FIG. 7B) to connect data words from the tape peripheral unit. This is seen in FIG. 8 by the signal line MUXSLAB. This signal indicates that the host 10 is "not" functioning to permit any host-buffer transfer during that clock cycle.

(RC-5): When (FIG. 8) the TCUCLOCK signal is synchronized (by block 59) to get TCLK and TCLK is "not active", this indicates that no data words are being loaded in the E and F latches of FIG. 8.

Thus, when these conditions are met via the input signals to $50_s$ of FIG. 8, the output AUWE/ is generated to gate 64 of FIG. 8 which then provides the strobe WE/ to buffer 22 to enable receipt of a data word via the stolen clock cycle.

Automatic Write

Referring to FIG. 8, this operation involves the automatic transfer of data words from the buffer $22_2$ through the C and D latches ($51_c$ and $52_d$) through interface 54 over to the peripheral tape unit $50_{tc}$. These automatic transfers from buffer to peripheral (write) are accomplished by stolen clock cycles according to the signal conditions indicated in block $50_{sw}$ (FIG. 7A) for auto-write cycle steal.

When the Automatic Write operation occurs, initially latches C and D (FIG. 8) are full, i.e., each holds a data-word. This operates as follows:

(a) An address of a word of data is pointed to by the $P_a$ register (FIG. 7) and the data word is moved to the C latch.

(b) Once the data word is written into buffer 22, the $P_a$ register is automatically incremented by $50_i$ (FIGS. 1, 7A) in order to point to the next address in buffer 22. The $P_a$ register is now ready for the next cycle steal (when it occurs).

(c) A flag signal "DRDY" (which operates similarly to the previously discussed TCUFLG 1 and 2) is used to signal the status condition of the C and D latches as to whether they are both full, or C is empty while D is full.

Thus, in FIG. 7A the block $50_{sw}$ indicates the signal conditions for operation of an Auto-Write cycle steal:

(WC-1): The DRDY signal must indicate that latch C is empty (and available to receive a word). The signal is DRDY (high).

(WC-2): The Auto-Write Logic ($50_a$ and $50_w$ of FIGS. 7A and 8) is "ON". This is controlled by the microcode from the common front end $10_c$. This is signaled by AUWREN.

(WC-3): The $P_a$ register is selected and the $S_a$ register is "not" selected which indicates that the $P_a$ register is active. This means that no transfers between host-buffer can occur in that clock cycle. The signal SMTPAD, when high, indicates that register $P_a$ is selected.

(WC-4): The previous clock cycle was "not" on an auto-write cycle-steal (indicated by CLATEN/).

Thus, with these signal conditions fulfilled, there is generated (from $50_{sw}$) the output CLATEN which enables a word transfer from buffer 22 over to the C latch.

When the TCU clock (FIG. 8) occurs, the data word is removed from the D latch and the data in C latch moves to the D latch. Then the flag DRDY gets updated to indicate that latch D is full and latch C is empty.

During a "Write" operation, the block counter $34_c$ (FIG. 1) counts the number of blocks of data received from the host system 10. The data link processor disconnects from the host system once the DLP has received six buffers; or upon receipt of the "Terminate" command from the host system (a "terminate" indicates the end of the Write data for that entire I/O operation). After disconnecting from the host, the data link processor $20_t$, FIG. 1, connects to the peripheral tape control unit $50_{tc}$. Once proper connection is established between the data link processor and the tape subsystem, the data link processor activates the Auto-Write $50_w$ logic. This allows the tape control unit a direct access to the DLP RAM buffer 22 or $22_2$ for use in data transfer to $50_{tc}$.

After the buffer 22 in the data link processor has transmitted one block (256 words) of data to the tape control unit, the data link processor $20_t$ attempts to "re-connect" to the host system 10 by means of a "poll request". Once this re-connection is established, the host transfers additional data to the buffer 22 of the data link processor. This transfer continues until either the six blocks of RAM buffer memory are again full (a buffer which is in the process of being transferred to the tape control unit is considered full during this procedure), or until the host sends a "terminate" command. Data transfer between the data link processor and the tape control unit $50_{tc}$ continues concurrently via interleaving cycles with the host data transfers to buffer 22. Thus while the DLP $20_t$ is re-establishing connection with host 10, the Auto Write Logic is transferring data from buffer 22 to Tape Control $50_{tc}$.

If the MT-data link processor has not successfully reconnected to the host before the DLP has transmitted four blocks of data to the tape control unit, the data link processor sets "emergency request" on the data link interface $20_i$ (DLI). If the "emergency request" is not successfully serviced before the DLP buffer 22 has only one block of data remaining for transmission to the tape control unit, the data link processor sets a "Block Error" condition via $34_e$ of FIG. 1. This is reported to the host system as a "host access error" in the result descriptor.

The last remaining block of data for any given I/O operation is transferred to the tape control unit $50_{tc}$ directly under microcode control of the common front end $10_c$. This is called a "demand mode" rather than the previously described "burst mode". Here the Auto-Write logic is not used for transfer of the last data block.

During a "Read" operation, the MT-data link processor first attempts to connect to the tape control unit, $50_{tc}$. Once a successful connection is accomplished, the data link processor initiates the "Auto-Read Logic" $50_r$ and begins accepting data from the tape subsystem. Once the data link processor buffer 22 has received two blocks of data (or once the DLP receives all the data from the operation if the total length is less than 2-blocks) the data line processor attempts to connect to the host 10 using a "poll request". The data link processor continues to accept data words from the tape peripheral while at the same time affecting this host connection.

If the host does not respond to the "poll request" before four blocks of data are present in the DLP RAM buffer 22, the data link processor sets "emergency request" on the data link interface (DLI). If no connection to the host system is effectuated before all of the six RAM buffers are filled, then the data link processor sets "host access error" in the result descriptor. This means that the peripheral data has "overfilled" the buffer 22 before the host 10 could manage to remove the data in the buffer 22.

Once the host system answers a "poll request", the data link processor $20_t$ starts to send data to the host system while interleavingly continuing to receive data from the tape control unit $50_{tc}$ under control of the Auto-Read Logic $50_r$. Thus (on a "Read" operation) while the buffer 22 is being "emptied" of data by transfer to host system 10, it is also being "filled" by operation of the Auto-Read Logic $50_r$. After the host 10 has received one block of data, the data link processor checks whether or not two full blocks of data remain to be transferred to the host. If this is so, the DLP uses a "break enable". If a break enable request is granted by the host, then transmission of the next data buffer to the host continues to occur. If there are less than two full blocks of data in the RAM buffer 22 (or if the "break enable" is refused), the data link processor disconnects from the host and waits for two full blocks of data to be present. If a "break enable" is refused, the data link processor initiates a "poll request" immediately after disconnection.

In the normal situation when there are more than two blocks of data to be transferred to the host system, the DLP sets the "burst counter" $36_c$ to 256 (words) and sends blocks of data to the host in the burst mode. When there are less than two blocks of data remaining to complete the I/O operation, the DLP calculates the actual length of the remaining data by comparing the P-register and S-register. The data link processor determines whether the remaining number of bytes is "odd" or is "even". If odd, the final byte is the PAD byte (all zeros inserted by the DLP). The final two blocks, whether partial or full, are sent to the host using a "demand" mode on a word by word transfer basis, where the sequencer in $10_c$ will instruct each word transfer individually rather than automatically as in the burst mode.

When the data link processor has completed data transfer, the tape control unit enters a "Result Phase" and sends two words of result status to the data link processor. The DLP then incorporates this information, plus any internal result flags, into the result descriptor which the DLP $20_t$ then sends to the host 10.

Referring to FIGS. 1, 7A, a block counter logic unit $33_c$ is used to receive input from two address registers designated as the peripheral address register, $P_a$, and the system address register, $S_a$. The peripheral address register, $P_a$, handles addresses required when data is retrieved from the peripheral tape unit or when data is being sent to the peripheral tape unit. The system address register, $S_a$, is used when data is being received from the host system into the buffer 22 or when data is being sent to the host system from the buffer 22. These two address registers in FIG. 1 are seen to receive their address data via microcode signals from the common front end circuit $10_c$ of FIG. 2.

The address data outputs from $P_a$ and $S_a$ are fed to the RAM buffer 22 in order to address the desired location in the buffer memory. Further, the block counter logic unit $33_c$ (FIG. 1) receives one input designated "P Carry" from the peripheral address register and another input "S Carry" from the system address register, in addition to a Read/Write control signal from read-write flip-flop $33_f$ (FIG. 1). The flip-flop $33_f$ is controlled by microcode signals from the control lines 43 (FIG. 6) of peripheral-controller common front end unit $10_c$. The block counter logic unit $33_c$ (FIGS. 1, 9) provides two output signals designated $S_1$ and $S_0$ which are fed to the block counter $34_c$ where the output signals $S_1$ and $S_0$ are combined at certain times on occurrence of rising clock signals in order to provide conditions which will make the block counter either "shift up" or "shift down" or "no shift".

The block counter $34_c$ will reflect the situation that when data is being taken out of the magnetic tape unit in order to be fed to RAM buffer 22 ("Read" operation), the block counter will shift up unless at the same time there is data being "removed" from buffer 22 for transfer to the main host computer system in which case the block counter $34_c$ will shift down. Thus, the condition of the block counter's numerical status will indicate the "balance" between what data has gone out of, and what data has come into, the RAM buffer 22.

Again referring to FIG. 1, a block counter logic unit $33_c$ is used to receive input from two address registers designated as the peripheral address register, $P_a$, and the system address register, $S_a$. The peripheral address register, $P_a$, handles addresses required when data is received from the peripheral tape unit for storage in buffer 22 or when data is being sent to the peripheral tape unit out of buffer 22. The system address register, $S_a$, is used when data is being received from the host system into the buffer 22 and when data is being sent to the host system from the buffer 22. These two address registers in FIG. 1 are seen to receive their address data via microcode signals from the common front end circuit $10_c$ of FIG. 1.

The address data outputs from $P_a$ and $S_a$ are fed to the RAM buffer 22 in order to address the desired location in the buffer memory. Further, the block counter logic unit $33_c$ receives one input designated "P Carry" from the peripheral address register and another input "S Carry" from the system address register, in addition to a Read/Write control signal from read-write flip-flop $33_f$. The flip-flop $33_f$ is controlled by microcode signals from the peripheral-controller common front end unit $10_c$. The block counter logic unit $33_c$ provides a first logic signal $LS_1$ and a second logic signal $LS_0$ which are fed to OR gates $G_1$ and $G_0$. These gates also have additional inputs from the microcode of the common front end card $10_c$ which inputs can be used to simulate the $LS_1$ and $LS_0$ signals for diagnostic or other control purposes. The OR gates provide two output signals designated $S_1$ and $S_0$ which are fed to the block counter $34_c$. As will be seen in FIG. 3, the output signals $S_1$ and $S_0$ are combined at certain times on occurrence of rising clock signals in order to provide conditions which will make the block counter either "shift up" or "shift down" or "no shift".

Referring to FIG. 3, there is seen a schematic drawing which illustrates the use of the block counter $34_c$ of FIG. 1.

Referring to FIG. 3, there is seen, schematically, an eight bit shift register (used as block counter $34_c$) which will be affected at selected points in time where the clock signal is in its "rising" state as illustrated by the arrows shown in FIG. 3. Referring to the leftmost schematic of the shift register, it will be seen that there are two "ones" which indicate that the RAM buffer 22 has been loaded with two full blocks of data. At time $T_1$ it will be seen that conditions are such that "no shift" has occurred and the two "ones" remain in the shift register. At time $T_2$ there is a "shift up" and the shift register $34_c$ now has three bits with the "1" signal. At time $T_3$ there is a "shift down" signal and the shift register is back where two bit positions include a "1". At time $T_4$ there is a "shift up" and the shift register now has three bit positions manifesting the "1" signal, which indicates three full blocks of data are residing in buffer 22 at that moment.

Referring to FIG. 4, there is seen a chart whereby the block counter logic unit $33_c$ is organized to show overall operating conditions. Thus, as seen in the FIG. 4 chart, the conditions of S Carry and P Carry during the "Read" condition show that there is a no shift or no change when S Carry and P Carry are the same, that is to say they are both 0 or they are both 1.

However, when S Carry is "0" and the P Carry is equal to "1", then there is an up shift, while if the S Carry is "1" and the P Carry is "0", there is a down shift during "Read" operations.

Referring to FIG. 4, it is seen that during "Write" operations, again when the S Carry and the P Carry are equal (both "0" or both "1") to each other, then there is no change or shift in the shift register. However, when the S Carry equals "0" and the P Carry equals "1" there is a down shift in this situation, and when the S Carry is equal to "1" and the P Carry is equal to "0" there is an up shift.

The block counter $34_c$ will reflect the situation that when data is being taken out of the magnetic tape unit in order to be fed to RAM buffer 22 ("Read" operation), the block counter will shift up unless there is data being concurrently removed from buffer 22 for transfer to the main host computer system in which case the block counter will shift down. Thus, the condition of the block counter's numerical status (on any clock cycle) will indicate the "balance" between what data has gone out of and what data has come into the buffer 22 at that point in time.

Referring to FIG. 4, if there is a "Write" operation, this determines that data is to be written into the magnetic tape unit. Then, as data is removed from the RAM buffer over to the magnetic tape unit, the block counter will shift down but if more data is transferred from the main host computer into the RAM buffer 22, the block counter will be shifted up. Thus, again the placement of "ones" in various bit positions provides a running balance of the data blocks taken out as against the data blocks taken in at any given period.

Referring to FIG. 4 there are certain logic equations which indicate the logic used in the block counter logic unit $33_c$.

In the following logic equations it should be indicated that the "asterisk" refers to AND logic operation while the "plus sign" refers to OR logic operation.

(a) If signal counter $S_1$ equals "1" and signal $S_0$ equals "0", there occurs what may be called a condition of "Up enable" which is equal to (Read * $\overline{S \text{ Carry}}$ * P Carry)+(Write * S Carry * $\overline{P \text{ Carry}}$).

(b) Under the conditions where the signal $S_1$ equals "0" and the signal $S_0$ equals "1", this could be considered as a "Down enable" which is equal to (Read * S Carry * $\overline{P \text{ Carry}}$)+(Write * $\overline{S \text{ Carry}}$ * P Carry).

(c) In the condition where the signal $S_1$ equals "0" and the signal $S_0$ equals "0", there is the condition called "no change". This is equal to (Read * S Carry * P Carry)+(Write * S Carry * P Carry).

(d) The condition known as the "host access error", $H_e$, causes the setting of a flip-flop $34_e$, FIG. 1. (This is also called a block counter error). Thus, the host access error signal or block counter error signal is a result of:

$H_e$=(Read * 6 BLKFUL)+(Write * 1 BLKFUL).

Thus, on a Read operation, a full RAM buffer (six blocks of data) will signal an error condition.

Likewise, on a Write operation, a single (one) remaining block of data will trigger an error condition.

Figures 5A, 5B:
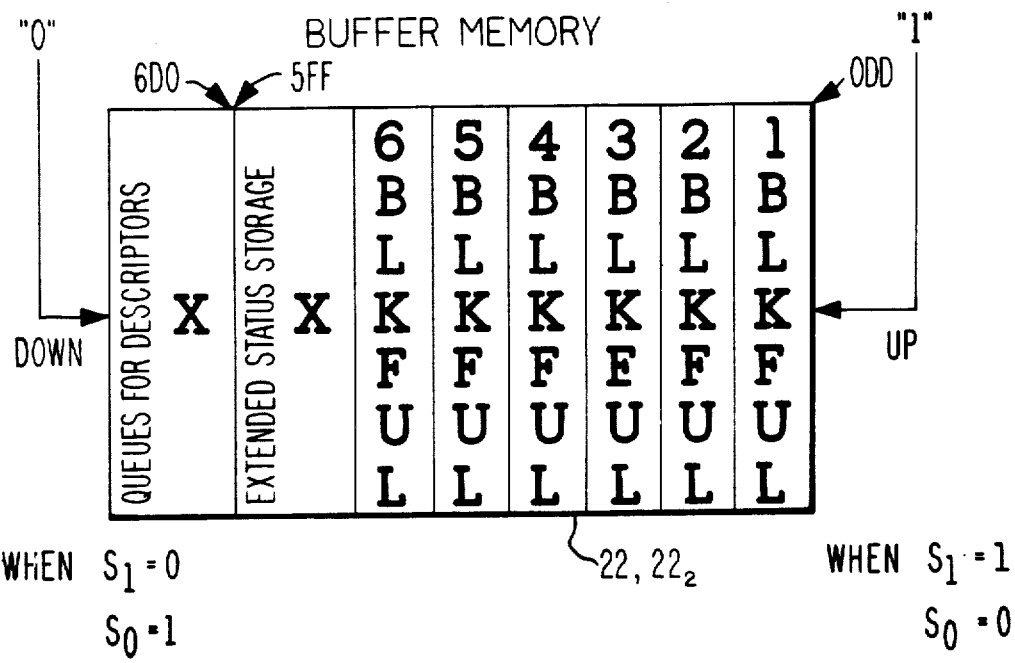
FIG. 5A is a schematic drawing illustrating the RAM buffer memory used for temporary storage of data-in-transit.
FIG. 5B is a chart indicating various "shift" relationships of the buffer memory block counter with regard to "Read" and "Write" operations.

Referring to FIG. 5A, a schematic drawing of buffer memory 22 shows that the status condition of each block of memory area is reflected by the block counter $34_c$ to indicate that when a "1" resides in a series of bit positions, (FIG. 3), it is an indication of how many blocks of data reside in the RAM buffer 22 (FIG. 1).

For example, if a "1" resides in each of bit positions 1, 2, 3, 4, this indicates that "4 blocks" of data reside in RAM 22. Each "block" consists of 256 words (512 bytes of eight bits each).

In FIG. 5B the chart illustrates that during "Read" operations:

(a) As the P Carry increases (data being transferred from peripheral tape to buffer memory 22), the block counter $34_c$ will "shift up" indicating the buffer is being "loaded".

(b) As the S Carry increases (data from buffer memory being transferred to main host system), the block counter $34_c$ will "shift down" indicating the buffer memory is being "emptied".

In FIG. 5B the chart illustrates that during "Write" operations:

(c) As S Carry increases (data being loaded in buffer memory from main host system), the block counter $34_c$ will "shift up" to indicate the number of blocks of data in the buffer.

(d) As P Carry increases (data in buffer being unloaded for transfer to peripheral tape unit), the block counter $34_c$ will "shift down" and show how much data is left remaining in buffer 22.

FIG. 5B, during "Read" operations, when a "1" appears in the 6th bit position of block counter $34_c$, then a flip-flop circuit $34_e$ (FIG. 1) is "set" and provides a signal to the common front end circuit $10_c$ which will inform the main system of an "access-error" condition. This signifies that the buffer memory 22 was "overfilled" in that the main host system did not accept data quickly enough.

During "Write" operations, when the buffer memory 22 has received six blocks of data from the host system, and the 1st bit position (1 BLKFUL) becomes "0", this indicates that the buffer memory has been completely unloaded (cleared) and then the flip-flop $34_e$ is set to signal the common front end circuit $10_c$ that more data is required from the host. This indicates the host did not supply data quickly enough to the RAM buffer 22.

The combination of the common front end CFE $10_c$ in combination with the peripheral dependent boards ($80_{p1}$, $80_{p2}$), PDB/1 and PDB2, combine to form a microprocessor unit which constitutes the peripheral-controller or data link processor, $20_i$.

Now referring to the operation of the two registers known as the peripheral address register, $P_a$, and the system address register, $S_a$, the function of loading these two registers $P_a$ and $S_a$ is controlled by the common front end, $10_c$, as follows:

(i) The $P_a$ and the $S_a$ registers are loaded via the microcode sequencer (CFE) which uses the ALU $32_u$. Microcode control is developed through the use of the common front end sequencer plus the ALU $32_u$ plus the two peripheral dependent boards PDB/1 and PDB/2.

(ii) The microcode uses the ALU output, or else the output from the C register $58_c$, in order to load addresses into the P register or the S register.

(iii) Thus, the microcode is used to feed address data into the registers $P_a$ and $S_a$.

Incrementing of the $S_a$ Register

The incrementing of the system register is done by the microcode control using the signal "CNTS". This is done as follows:

(a) On a Read operation when the DLP sends a word over to the host system 10;

(b) On a Write operation when the DLP (buffer memory 22) receives one word from the host system (16 bits);

(c) The S register is incremented under microcode control when one data word is transferred between the DLP buffer memory and the host. Thus, the address data residing in the $S_a$ register will have a "1" added to its address when a data word is transferred from the buffer memory 22 to the host 10 or when a word is transferred from the host to the buffer memory. It may be understood that the $S_a$ and the $P_a$ registers are "pointers" which point to an address in the RAM buffer memory 22 so that the buffer memory can be loaded with a data word and "counted" as to having received the data word. Reversely, the removal of a data word from the buffer will be "counted" also in a negative sense.

Operation of the Peripheral Register $P_a$

The peripheral address register $P_a$ is incremented under either microcode control or by using the automatic increment logic (FIG. 1 designated as $50_i$) under two conditions, such as:

(a) When one data word is transferred on a Read operation to the DLP buffer memory 22 from the peripheral device (TCU $50_{tc}$); or (b) When a data word is sent from the DLP buffer memory 22 over to the peripheral device on a Write operation.

The "incrementing" of the peripheral register, $P_a$, is done under "microcode control" when a data transfer occurs (under microcode control) between the data link processor buffer memory 22 and the peripheral tape unit.

The "incrementing" of the peripheral register, $P_a$, is effectuated by the automatic incrementation register logic unit $50_i$ when word transfers occur between the buffer 22 and peripheral tape unit $50_{tc}$ under control of the automatic read logic $50_r$ (FIG. 8). This is because the DLP microcode sequencer, while transferring data to/from the host, is freed from having to control word transfers between the DLP buffer memory 22 and the peripheral tape unit, $50_{tc}$.

As seen in FIG. 1, the Automatic Incrementor P logic, $50_i$, has three input signals. The C latch enable signal (CLATEN/) comes from the Auto Write Logic $50_w$ of FIG. 8, and indicates that a data word was transferred to the output C latch ($51_c$) from the buffer memory 22 (Write operation). The AUWE/input $50_i$ is a Read signal (non-write) from cycle steal logic $50_s$ (which indicates that a data word was transferred from input latch F to the buffer memory on a Read operation) while the input signl CNTP/ is a count enable signal from the front end 10. The output CNTP from $50_i$ will increment (microcode control) the address residing in $P_a$.

The automatic read logic $50_r$ system is described in more detail in co-pending U.S. application Ser. NO. 480,517, filed Mar. 30, 1983. It can be looked upon as a hardware aid to the microcode so as to enable concurrent data transfers efficiently to occur between the DLP buffer memory 22 and the peripheral tape unit (using interleaving cycle steal operations) while the normal clock cycles are alternately used for host-to-buffer word transfers.

The system register $S_a$ and the peripheral register $P_a$ are used to provide addresses to the buffer memory 22 at any point in time in order that data may be placed in that particular address location or that data may be removed from that particular addressed location.

It should be noted in FIG. 7A that the $P_a$ register and the $S_a$ register outputs are fed into gates $G_p$ and $G_s$ which selectively choose whether the $S_a$ register address-data or the $P_a$ register address-data will feed into the multiplexor $32_x$ to be conveyed to the RAM buffer 22.

Figure 11:
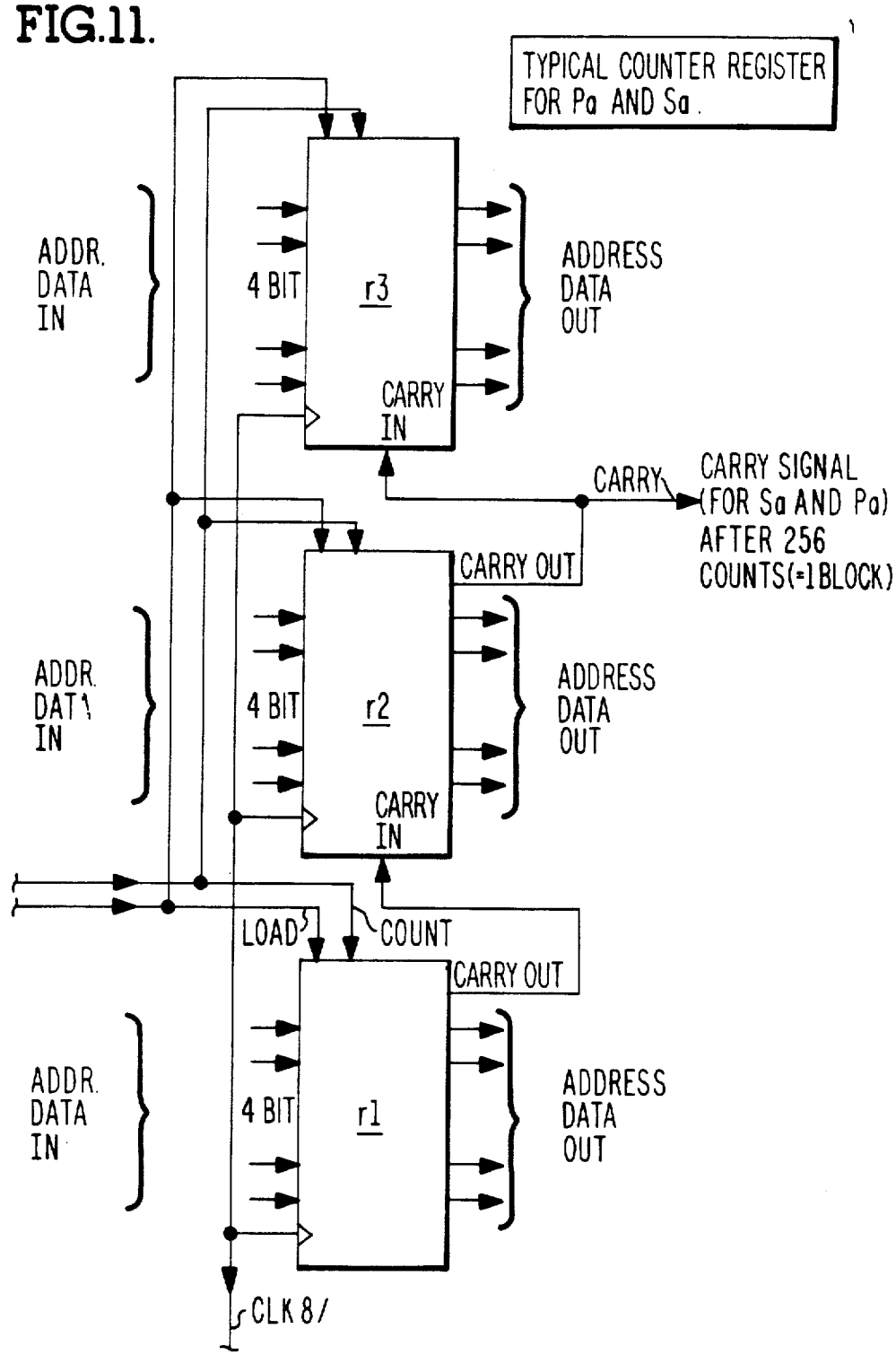
FIG. 11 is a drawing of a three stage counter used to provide the P carry or the S carry signal after 256 counts to indicate one full block of data words have been addressed in the buffer memory.

In FIG. 11 there is seen the basic structure of each register ($P_a$ and $S_a$). The P register and the S register are composed of three binary counters ($r_1$, $r_2$ and $r_3$) wherein each of the binary counters carries four bits individually and 12 bits in composite. The composite of $r_1$, $r_2$, $r_3$ is organized from the least significant bits ($r_1$) up to the most significant bits ($r_3$). Thus, each time the particular register is incremented, it keeps adding an extra bit to the counter so that each time (that either the $P_a$ register or else the $S_a$ register is incremented) the binary counter will register this increment until such time (after a count of 256 words) that the P carry or the S carry signal is generated.

This particular "S carry" or "P carry" signal will not be generated until there has been 256 incremental counts given to the three section binary counter. This means that 256 counts have been made which is the sum total or amount devoted to one full block of message data.

The particular type of peripheral and system address registers used in this embodiment involve a standard type chip known as a TTL logic chip 74161. Three of these chips are used in order to constitute a single address register. Thus, the $P_a$ address register has three chips and the $S_a$ register has three chips. The output "carry signal" only occurs when the counting has accomplished a value to signify that 256 addressed words have been moved (in or out). Thus, this means that one "full block" of words of message data has been handled.

In FIG. 3, the gates designated $G_p$ and $G_s$ receive a control signal (SMTPAD/) from the common front end which determines which one of the address registers will have its address data fed to the multiplexor $32_x$. Thus, the $G_p$ gate may be turned on to permit peripheral address data to be fed through or on the other hand the $G_p$ gate may be turned off and the $G_s$ gate may be turned on in order to let address data from the system register be placed into the multiplexor $32_x$ (FIG. 7B).

As seen in FIG. 1, the P carry and S carry output signals are fed to the Block Counter Logic $33_c$. Now referring to FIG. 9, a more detailed look at the Block Counter Logic, $33_c$, is shown. This logic is now seen to have a first flip-flop logic unit designated $33_s$ and a second flip-flop logic unit designated $33_p$. The first logic unit $33_s$ has an input designated as the S carry and also the basic eight megahertz clock CLK 8/; and likewise the second logic unit $33_p$ has an input designated P carry and also the eight megahertz clock CLK 8/.

The flip-flop logic unit $33_s$ and $33_p$ are identical chips which are designated in the field as 74S74. This chip is described in the Texas Instruments Company TTL Data Book, 2nd Edition, copyright 1976, at page 6-46. This book is published by the Marketing Information Services Group of the Texas Instruments Company, Inc., P.O. Box 5012, MS 308, Dallas, Tex., 75222.

It will be seen that the logic unit $33_s$ has an output designated SCR8 which feeds into the logic chip $33_e$. Likewise, the logic unit $33_p$ has an output designated PCR8 which feeds as an input to the logic chip $33_e$. Additionally, the logic chip $33_e$ has other inputs designated as Read and as Write to determine whether a Read operation is in progress or whether a Write operation is in progress.

The logic chip $33_e$ is designated as a 74S139 which is a TTL chip described at page 7-134 in the Texas Instruments Company TTL Data Book, 2nd Edition, copyright 1976, and which is published by Marketing Information Services, Texas Instruments Company, Inc., P.O. Box 5012, MS 308, Dallas, Tex., 74222.

The logic chip $33_e$ is seen to provide two output signal lines designated as $LS_1$ and $LS_0$. The output signal $LS_1$ is used for counting "up" or raising the number level of block counter $34_c$, while the signal designated $LS_0$ is used for the count "down" or lowering the status information in the block counter $34_c$. The counter $34_c$ is a 74S194 chip described at page 7-316 of the abovementioned Texas Instruments TTL Data Book.

Here it will be noted by reference to FIG. 1 that the OR gates $G_1$ and $G_0$ convey the $LS_1$ and the $LS_0$ signals to the block counter $34_c$ as new signals designated $S_1$ and $S_0$. The OR gates involved here ($G_0$ and $G_1$) permit the alternate use of microcode signals in order to exercise the block counter $34_c$ when it is necessary to make a diagnostic test of system operation.

Thus, the signal $S_1$ is used for the "up count" or incrementing of the block counter, while the signal $S_0$ is used for the "down count" or decrementing of the block counter $34_c$.

Figure 10:
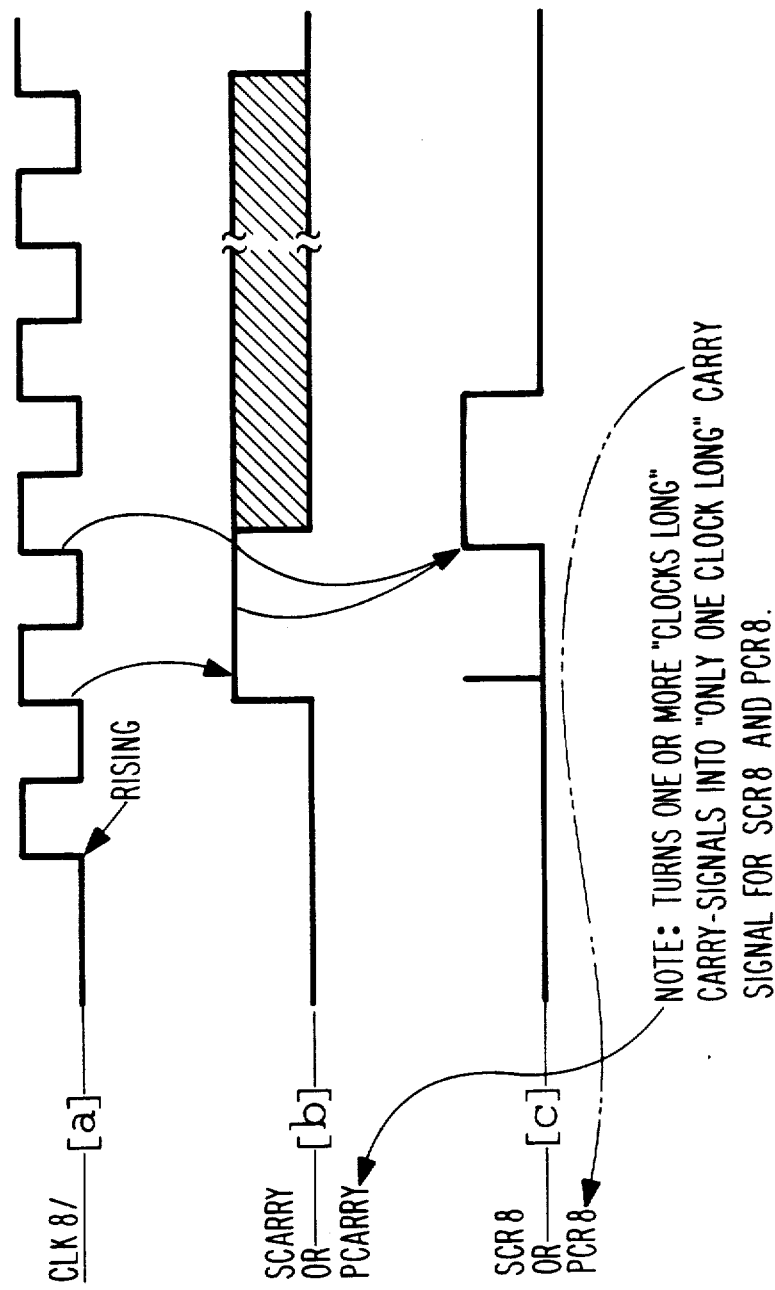
FIG. 10 is a timing diagram showing how the basic clock cooperates with the S carry and P carry signals to provide the SCR8 or PCR8 signal for 5B.

Now referring to FIG. 10, there is seen the (a) basic clock signal CLK8/ whereby the rising pulse is used to (b) initiate the S carry signal or the P carry signal. After The S carry or the P carry signal occurs, it is triggered by the next following rising pulse of the basic clock signal in order to form the rising pulse on line (c).

The purpose of this is so that a carry signal (which may be one or more clocks long) will be effective only to indicate a signal that is "one clock long" as a carry. This is to operate so that when the block counter logic $33_c$ has counted 256 words being addressed on a Read or on a Write operation, then only "one pulse" (whether incrementing or decrementing) will be sent to the block counter $34_c$.

An equivalent functioning circuit to the block counter logic $33_c$ could be an AND gate with eight bit-input lines which could be used to perform the same task as the block counter logic in that the eight bits of input can count up to the number 256, after which time there would be an output signal on the carry line.

Figure 9:
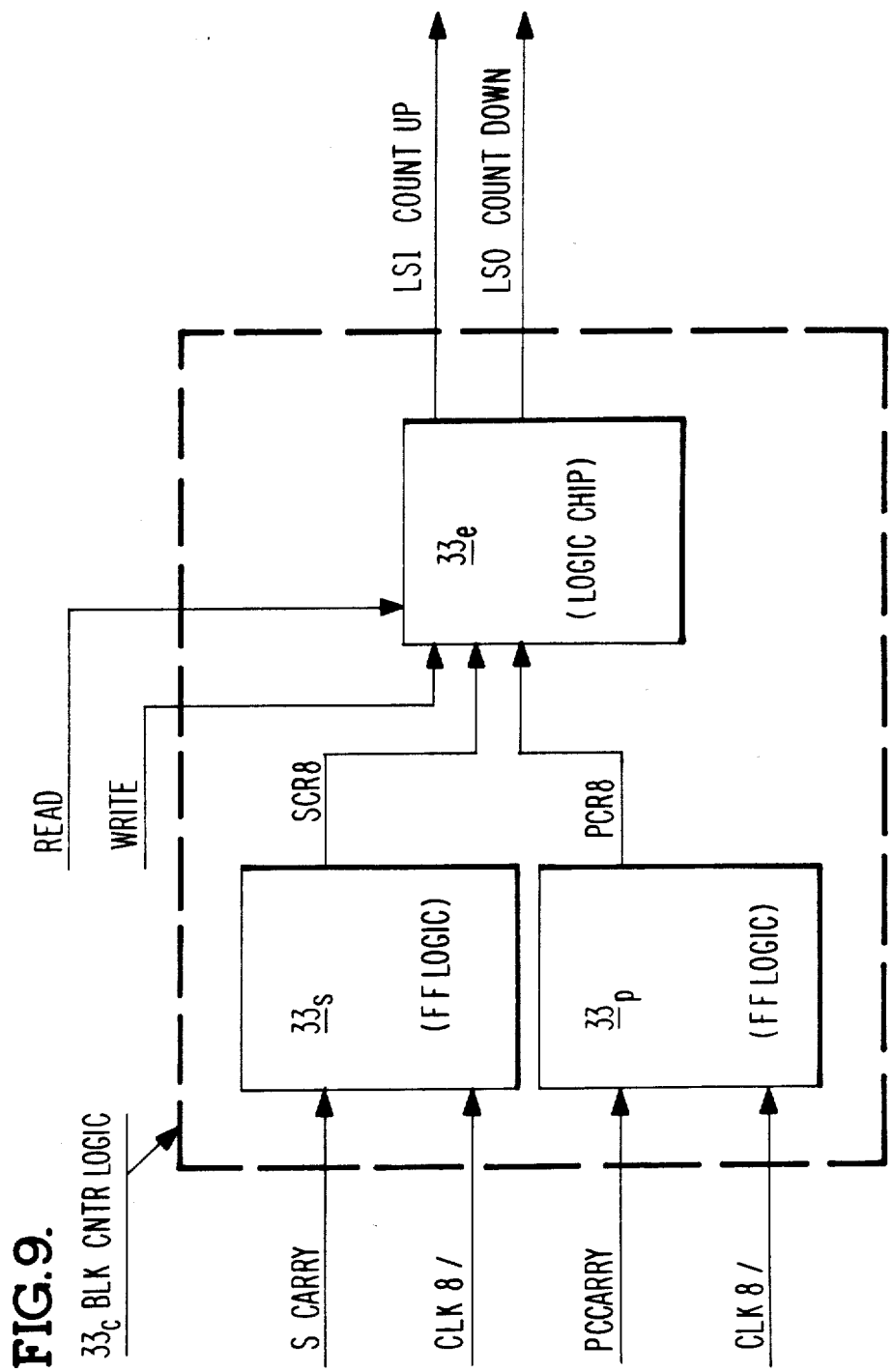
FIG. 9 is a detailed block drawing of the block counter logic $33_c$ of FIG. 1.

Referring to FIG. 9 and also FIG. 4, there is seen the operative effect of what occurs with the signal SCR8 (buffer-host transfers) and also what happens with the signal PCR 8 (buffer-peripheral tape transfers). It will be seen that conditions exist as follows:

(i) On a Read operation, the SCR8 signal will cause a down count in $34_c$ to show an emptying of the buffer memory;

(ii) Likewise, the SCR8 signal, on a Write operation, will be such as to increment the block counter $34_c$ to show that the buffer is being filled up;

(iii) The PCR 8 signal on a Read operation will indicate that the buffer memory is being filled from the peripheral unit and thus give an "up" count.

(iv) The PCR 8 signal on a Write operation will indicate a down count or an emptying of the buffer memory into the peripheral tape unit.

Each of these various down-counts or up-counts in the Read or in the Write operations are logically indicated by the bit condition of the signals $LS_1$ and $LS_0$ as shown in FIG. 4.

Likewise, it should be noted in FIG. 4 that when there is "no change" in the S carry and in the P carry, then there is no change in the condition status of the block counter, $34_c$.

The presently disclosed system includes a network whereby a plurality of data link processors (peripheral controllers) can be operating concurrently and simultaneously in transferring data words between each buffer memory (of each data link processor) and its particular set of peripheral tape units; and while such concurrent data transfers are taking place, a selected data link processor can interleave clock cycles to provide data transfers between the host system and a selected buffer memory whose data link processor has gotten some "connection time" to the host system. Due to the high speed "burst mode" transfer function between host and a selected buffer memory, the host system can provide alternating data transfer "connection time" to each of the DLP memories in the network as each DLP has requirements for access to the host.

While the system provides for multiple series of host-buffer transfers, it should be observed that the Automatic Read/Write system logic in each DLP (data link processor) relieves the DLPs microcode sequencer and Arithmetic Logic Unit in order to permit buffer peripheral word transfers to occur while permitting the common front end $10_c$ to maintain communication and interchange with the host system 10.

In the described system, there is provided two separate levels of counters. The "first level" of counters involve the registers $P_a$ and $S_a$. This level of counters is useful to count every single word location that is addressed in the buffer memory 22. Then a "second counter level" is the block counter logic $33_c$ combined with the gates $G_0$ and $G_1$ together with the block counter $34_c$ which operate to count blocks (of 256 words) and which serves to either increment or decrement each of the eight-bit-places in the block counter $34_c$ (FIG. 3). This may be likened to a first set of counters which counts pennies and to which there are connected a second set of counters which counts dollars, which is to say that each time one hundred pennies are registered, then the second level counter will register merely "one" dollar.

A significant feature of the system is the use of the automatic incrementation system for the $P_a$ address register. There is provided an automatic incrementing of the addresses in the $P_a$ register (for data transfer operations as between the peripheral terminal unit and the buffer memory 22). As seen on the peripheral card #1 of FIG. 7A, the automatic incrementing P register designated 50$_i$ provides an output designated CNTP to the $P_a$ register.

Another feature in this respect is the "automatic wraparound" of the $P_a$ counter. This is a feature which is used with the buffer memory 22 as seen in FIG. 5A. Here the RAM buffer memory has memory area available for six full blocks and these addresses go from 000 up to 5FF (hexidecimal notation). However, the RAM buffer memory 22 has also further locational capacity for other internal use of the data link processor. This extra locational capacity starts with the address 600 and goes up. This extra locational capacity is used for housekeeping functions to give storage for status signals for use of I/O descriptor words including result descriptor words, in addition to providing a set of queues where operational data can be stored. Since the six blocks of buffer memory addresses 000-5FF are used only for storage of words being transferred, the wraparound feature detects when the address 5FF is reached, so that the "pointer address" of the $P_a$ register will now return to the address 000 rather than intruding into the higher addresses of the buffer memory beyond address 600 of FIG. 5A.

The system is provided with two levels of additional buffer time on data transfers. For example, as seen on the peripheral card #2 in FIG. 8, when data words are being transferred from the peripheral 50$_{tc}$ over to the RAM buffer memory 22, there is a double buffering stage moving words through two latches called the E-latch 51$_e$ and the F-latch 52$_f$. This is operable on the phase of "Read" operations. This provides extra time, when words are being loaded into buffer memory, for words to be unloaded from buffer memory over to the host 10, thus providing more available memory space in buffer memory 22. Likewise, on the phase of "Write" operations where there is a data transfer from buffer memory over to the peripheral units, there are two levels of extra buffer time provided through the C-latch 51$_c$ and D-latch 52$_d$ (FIG. 8).

"Automatic" incrementation of the $P_a$ register occurs in the system when the F-latch (getting input from peripheral terminal unit) gets written into the buffer memory 22 (on a Read operation) or when a word from the buffer memory 22 gets loaded into the C-latch (indicating a transfer from the buffer memory to the peripheral terminal unit). When this happens, then the automatic incrementation mechanism 50$_i$ will then "increment $P_a$" so that the register $P_a$ will then point to the next address of a word in the buffer memory 22.

The block counter 34$_c$ (FIGS. 1 and 3) is a "second level" counter, that is to say it counts blocks of words (256 words to a block).

One feature of the block counter logic 33$_c$ is that it uses the carry out of the $S_a$ and $P_a$ registers as well as carrying out "knowledge" of whether it is a "Read" or a "Write" operation. This permits the block counter 34$_c$ to do its job in the proper function according to whether the operation is a read operation or a write operation (thus it properly operates to increment or decrement the block counter).

The block counter logic 33$_c$ of FIG. 1 provides certain featural advantages. For example, when both registers $S_a$ and $P_a$ have a Carry signal occurring on the "very same clock", then these two signals will "nullify" each other immediately during that clock period. This is a distinct advantage in a time-accuracy saving fashion since there is no longer any need for two additional clock cycles to occur in order to go into an incrementation mode and then a decrementation mode in order to come out with a nullity. Thus, without this feature, there would be two additional clock-time periods where there would be complete misrepresentation of the buffer memory situation before the accurate situation could occur at the third clock period. Thus, the block counter logic 33$_c$ provides a feature where accuracy of the buffer memory condition is instantaneous and does not require three more clock cycles before it can show the true nature and status condition of the buffer memory 22.

Another feature shown in FIG. 1 is the use of the error flip-flop 34$_e$. This flip-flop outputs an access error condition signal which can be tested by the microcode from the common front end 10$_c$, and which may indicate the need for corrective action. Thus, the flip-flop 34$_e$ is provided as a "watcher" of the block counter 34$_c$ so that when the buffer memory is overloaded or is underloaded so as not to be able to provide data to the peripheral, then under these conditions an error signal must be returned to the host computer so that the operation can be retried. Thus, the block counter 34$_c$ is, in a sense, a slave which provides information to flip-flop 34$_e$. When the common front end 10$_c$ uses microcode to check out the flip-flop 34$_e$, it can see if an error signal is "set". Then the common front end 10$_c$ can send a result word status signal signifying the access error condition over to the host so it can retry the data transfer operation which was incomplete.

Another feature can be seen with reference to FIG. 9. The S carry logic 33$_s$ provides a signal SCR8 while the P carry logic 33$_p$ provides a signal PCR8. That is to say that the flip-flop logic 33$_s$ plus the flip-flop logic 33$_p$ provides outputs which feed into the logic chip 33$_e$. The logic chip 33$_e$ combines these signals with the "Read" or the "Write" signals operative at that moment in order to determine whether there should be a "count up" signal (LS$_1$) or whether there should be a "count down" signal (LS$_0$). This has the effect, as shown in lines a, b, c of FIG. 10, that whenever there is an S carry signal or a P carry signal and this is combined with the next subsequent rising basic clock signal (CLK8/), then there will only be "one" output pulse even though the S carry or the P carry continues on for a longer duration of time. Thus, only a single count occurs for an S carry or a P carry, which is the proper requisite, rather than a series which might occur if the S carry or the P carry signal continued in its set position.

The data link processor system has a "burst" mode for data transfers as between the host system 10 and the buffer memory 22 whereby exceedingly rapid word transfers can occur between the host and a selected buffer memory. This permits the single host system to service up to eight separate data link processors each having its own buffer memory.

In summary, the present disclosure provides a specialized peripheral-controller (called a DLP, data link processor) usable in multiple units to cooperate with a host system for handling data transfers between multiple tape peripheral units and the main host system. Each DLP has a buffer memory organized in blocks of 256 words which is monitored by a "memory monitor sensing means". This sensing means counts the number of words addressed in the buffer memory and whether a Read or Write operation is occurring, and whether the data word transfer is (a) a buffer-host transfer or (b) a buffer-peripheral unit transfer. This information is processed by a block counter logic unit and gating means to constantly update a block counter which keeps tally of the number of data blocks residing in the buffer memory.

Thus, the block counter can provide information to the common front end microcode sequencer as to memory status so that the common front end can select appropriate programs of action.

Additionally, the memory monitor sensing means provides an error flip-flop signal means to signal requests for action when (i) the buffer memory has been "overfilled" (with consequent loss of data) or (ii) the buffer memory is "underfilled" and has insufficient data words to supply to a peripheral tape unit on a specific write data transfer cycle.

The memory monitor sensing means features automatic incrementation of its peripheral address register in conjunction with the Automatic Read/Write operations used for buffer-peripheral unit transfers. Additionally, the sensing means is updated, on each clock cycle, as to the status of data blocks residing in buffer memory. There is no lag on correctly maintaining concurrent data block status information.

These concepts and other described features serve to optimize the rate of data transfer operations while minimizing the occurrence of incomplete or error-cycles of operation. The disclosed data link processor system may be implemented in a variety of ways but should be deemed to be defined by the claims attached hereinunder.

What is claimed is:

1. In a network wherein data is transferred between a main host computer and a magnetic tape peripheral unit via a peripheral-controller, wherein said peripheral-controller is initiated by commands from said host computer to execute data transfer operations and said peripheral-controller includes a common control circuit unit for sequencing microcode instructions and a peripheral dependent circuit unit for managing said tape peripheral unit, the system for regulating data transfer operations comprising:
  (a) buffer memory means in said peripheral-controller for temporarily storing blocks of data being transferred, said buffer memory means having channels of connection to said tape peripheral unit and said host computer;
  (b) status sensing means in said peripheral dependent circuit unit for providing status signals to said common control circuit for indicating the number of blocks of data residing in said buffer memory means during each clock cycle;
  (c) signal output means connected to said status sensing means and functioning to provide said status signals to said common control circuit unit;
  (d) said common control circuit unit including:
    (d1) means for generating basic clock cycles;
    (d2) means for executing buffer-host data work transfers using said basic clock cycles;
    (d3) means for concurrently executing buffer-peripheral data word transfers by stealing selected clock cycles of said basic clock cycles;
    (d4) wherein said means for executing and said means for concurrently executing are controlled in response to said status signals.

2. The system of claim 1, wherein said means for executing buffer-host data word transfers include:
  (a) a burst mode data word transfer operation functioning to transfer data words between said buffer memory means and said host computer at a speed at least eight times faster than data word transfers between said buffer memory means and said peripheral tape unit.

3. The system of claim 2, wherein said status sensing means includes:
  (a) shift register count means having "$X_m$" bit positions where a "true" signal in each bit position represents a full block of N data words residing in said buffer memory means during that clock cycle, said "true" signal being incremented/decremented for each block of data words added to/removed from said buffer memory means;
  (b) block counter logic means for incrementing-/decrementing said shift register count means, and including:
    (b1) means for counting blocks of data words added to/removed from said buffer memory means.

4. A system for maximizing the effective rate of data transfer operations between a host computer and a peripheral tape unit, wherein data transfer instructions from said host computer are executed by a peripheral-controller having a data buffer storage means and a microprocessor means, said system comprising, in combination:
  (a) data buffer storage means organized to store data words in multiple blocks where each block holds N data words;
  (b) said data buffer storage means having channels of connections between said host processor and said peripheral tape unit and functioning to temporarily store data words-in-transit between said host computer and said peripheral tape unit;
  (c) buffer memory sensing means for providing status data signals to said microprocessor means, as to the number of blocks of data words residing in said buffer storage means during each basic clock cycle;
  (d) said microprocessor means for selecting and controlling data transfer operation cycle and including:
    (d1) means for generating basic clock cycles;
    (d2) means for sensing said status data signals;
    (d3) means for addressing data words in said buffer storage means;
    (d4) means for concurrently executing Read/Write data transfer cycles between said buffer storage means and said host processor, and between said buffer storage means and said peripheral tape unit.

5. The system of claim 4, wherein said microprocessor means includes:
  (a) Automatic Read/Write logic means for executing data word transfer of blocks of data between said buffer storage means and said peripheral tape unit without interruption to said microprocessor means wherein selected basic clock cycles are stolen from buffer-host transfers to be used for buffer-peripheral tape transfers.

6. In a system using a peripheral controller providing for word transfers between a host computer and buffer memory, and for concurrent word transfers between a peripheral tape unit and buffer memory, and operating to monitor the number of blocks of data words in said buffer memory and to provide control signals to a microprocessor means in said peripheral controller for maximizing the rate of data transfers and minimizing the occurrence of incomplete transfer cycles, the combination comprising:

(a) a buffer memory organized to store blocks of "N words" each of data and including:
 (a1) first channel means for transferring data between said buffer memory and said host computer;
 (a2) second channel means for transferring data between said buffer memory and said peripheral tape unit;
(b) block counter register means receiving block count increment/decrement/no change signals from a block counter logic unit and including:
 (b1) means to store status signals representing the number of blocks of data words residing in said buffer memory at each clock cycle;
 (b2) means to communicate said status signals to said microprocessor means;
(c) said block counter logic means including:
 (c1) means to count the number of data words transferred between said buffer memory and said host computer for each selected transfer cycle, via receipt of a system data block signal from an address register means;
 (c2) means to count the number of data words transferred between said buffer memory and said peripheral tape unit for each selected transfer cycle, via receipt of a peripheral data block signal from said address register means;
 (c3) means to sense the condition of each selected transfer cycle as to being a Read or a Write operation through Read/Write microcode signals from said microprocessor means;
 (c4) means to generate said increment/decrement/no change signal to said block counter register means;
(d) address register means for receiving buffer memory addresses from said microprocessor means and including:
 (d1) system address register means for sensing the number of data words transferred between said host computer and said buffer memory, on a selected transfer cycle, and generating a system data block signal for each block of N words;
 (d2) peripheral address register means for sensing the number of data words transferred between said buffer memory and said peripheral tape unit on a selected transfer cycle, and generating a peripheral data block signal for each block of N words;
(e) microprocessor means for controlling and selecting data transfer cycles and including:
 (e1) means for selecting Read/Write data transfer cycles between said host and buffer memory or between said peripheral tape unit and buffer memory, and including means to generate said Read/Write microcode signals to said block counter logic means;
 (e2) means for sensing said status signals in said block counter register means to enable selection of the optimum data transfer operation;
 (e3) means for generating basic clock cycles for enablement of buffer memory-host computer data transfers;
 (e4) means for selectively stealing certain of said basic clock cycles for enablement of buffer memory-peripheral tape data transfers;
 (e5) wherein concurrent data transfers between buffer-host and transfers between buffer-peripheral may be interleaved.

7. The combination of claim 6 including:
(a) automatic Read/Write logic means, initiated by said microprocessor means, for controlling data word transfers between said buffer memory and tape peripheral unit using stolen clock cycles concurrently with data word transfers occurring between said host and buffer memory.

8. The combination of claim 7 which includes:
(a) automatic incrementing register means for automatically incrementing said peripheral address register means during operation of said automatic Read/Write logic means.

9. The combination of claim 8 which includes:
(a) means for testing said block counter register means by simulating said increment/decrement/no change signals.

10. In a peripheral controller which manages data transfers between a host computer and a peripheral tape until wherein said peripheral controller has a buffer memory for temporary storage of data words-in-transit and provides a rapid burst-mode routine for host-buffer data transfers and automatic read/write logic control for buffer-peripheral tape data transfers, said burst routine and automatic logic control occurring concurrently on an interleaving clock cycle operation, an optimizing system for monitoring the number, on each clock cycle, of blocks of data words residing in said buffer memory to provide information for said peripheral controller in selecting optimum routines for maximizing the rate of data transfer operations while minimizing the likelihood of incomplete and erroneous data transfer cycles, said optimizing system comprising:

(a) buffer memory means having a first communication channel to a host computer system and a second communication channel to a peripheral tape unit, and including:
 (a1) address bus connection means for receiving addresses from a system address register and a peripheral address register;
(b) said system address register for temporary storage of buffer addresses to be accessed in said buffer memory means when data words are being transferred between said host computer and said buffer memory means, and including:
 (b1) system bus connection means for receiving addresses from a microprocessor means;
 (b2) means to generate a system-carry signal when "N" data words in said buffer memory means have been addressed;
(c) said peripheral address register for temporary storage of buffer addresses to be accessed in said buffer memory means when data words are being transferred between said buffer memory means and said peripheral tape unit, and including:
 (c1) peripheral bus connection means for receiving addresses from said microprocessor means;

(c2) means to generate a peripheral-carry signal when "N" data words in said buffer memory means having been addressed;

(d) block counter logic means receiving said system-carry and said peripheral-carry signals together with a Read/Write signal from said microprocessor means, said logic means generating, on each clock cycle, a first and second count logic signal to a gating means;

(e) gating means for generating, on each clock cycle, an up-count signal, down-count signal, or a non-count signal to a block counter register means and including:

(e1) means for generating said up-count, down-count or non-count signals via microcode signals from said microprocessor means in lieu of said block counter logic means;

(f) said block counter register means having "$X_m$" bit positions where a "true" signal in each bit position represents a full block of N data words as presently residing within said buffer memory means, and wherein said up-count signal acts to increment the number "X" of true signals in said bit positions while said down-count signal acts to decrement the number "X" of true signals in said bit positions;

(g) said microprocessor means generating basic clock cycles and operating routines for executing (i) Read/Write data word transfers between said host and said buffer memory means, and (ii) Read/Write data word transfers between said buffer memory means and said peripheral tape unit, said microprocessor means including:

(g1) means to generate buffer memory addresses for transmittal to said system and said peripheral address registers;

(g2) means to generate Read/Write control signals to said block counter logic means;

(g3) means to generate up-count, down-count, non-count microcode signals to said gating means for testing operation of said block counter register means;

(g4) means to scan said block counter register means to establish the number "X" of blocks of data words residing in said buffer memory means;

(g5) means for selecting the next appropriate operating routine based on the value of the said number "X".

11. The system of claim 10 wherein, on a Read operation, when the value of X is less than 2 (blocks), the said microprocessor means will disconnect said first communication channel to said host computer to permit it to service other peripheral controllers.

12. The system of claim 10 wherein, on a Read operation, when the value of X is "2" or greater, the said microprocessor means will initiate a connection on said first communication channel to said host computer and execute a burst mode data transfer operation from said buffer memory means to said host computer.

13. The system of claim 10 wherein, on a Read operation, when the value of X is "6", said microprocessor means generates an access error signal to said host computer.

14. The system of claim 10 wherein, on a Write operation, when the value of X reaches "6", the said microprocessor means will disconnect said first communication channel to said host computer to permit it to service other peripheral controllers.

15. The system of claim 10 wherein, on a Write operation, when the value of X reaches "1", the said microprocessor means will generate an access error signal to said host computer.

* * * * *